(12) United States Patent
Ujibashi

(10) Patent No.: US 9,342,133 B2
(45) Date of Patent: May 17, 2016

(54) INFORMATION PROCESSING APPARATUS AND POWER SAVING CONTROL METHOD

(71) Applicant: FUJITSU LIMITED, Kawasaki-shi, Kanagawa (JP)

(72) Inventor: Yoshifumi Ujibashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 187 days.

(21) Appl. No.: 14/254,959

(22) Filed: Apr. 17, 2014

(65) Prior Publication Data

US 2014/0337648 A1 Nov. 13, 2014

(30) Foreign Application Priority Data

May 7, 2013 (JP) ................................. 2013-097649

(51) Int. Cl.
*G06F 1/32* (2006.01)
(52) U.S. Cl.
CPC ................ *G06F 1/324* (2013.01); *G06F 1/329* (2013.01); *Y02B 60/1217* (2013.01); *Y02B 60/144* (2013.01)
(58) Field of Classification Search
None
See application file for complete search history.

(56) References Cited

U.S. PATENT DOCUMENTS

| 5,664,201 A | 9/1997 | Ikedea |
| 2014/0137122 A1* | 5/2014 | Egolf ................... G06F 9/4893 718/102 |

FOREIGN PATENT DOCUMENTS

| JP | 05-27867 | 2/1993 |
| JP | 05-297993 | 11/1993 |
| JP | 08-202548 | 8/1996 |

* cited by examiner

*Primary Examiner* — Paul Yanchus, III
(74) *Attorney, Agent, or Firm* — Fujitsu Patent Center

(57) ABSTRACT

An information processing apparatus includes a detection unit and a frequency control unit and is designed to activate power saving control and perform information processing. The detection unit detects an idle time of a processor caused by job scheduling. The frequency control unit reduces the operating frequency of the processor for executing a job scheduled to be executed immediately before the idle time, below the maximum frequency. At this time, the frequency control unit reduces the operating frequency such that the execution time of the job is extended to the execution start time of a waiting job, which is included in the idle time.

7 Claims, 35 Drawing Sheets

FIG. 6
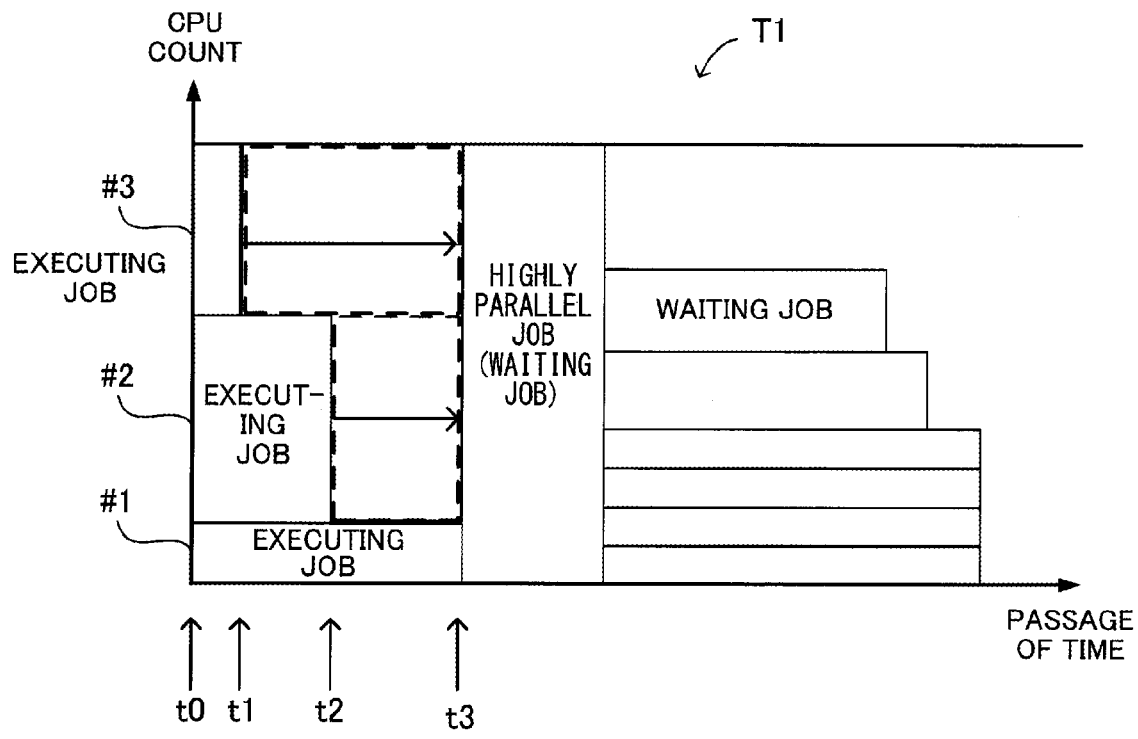
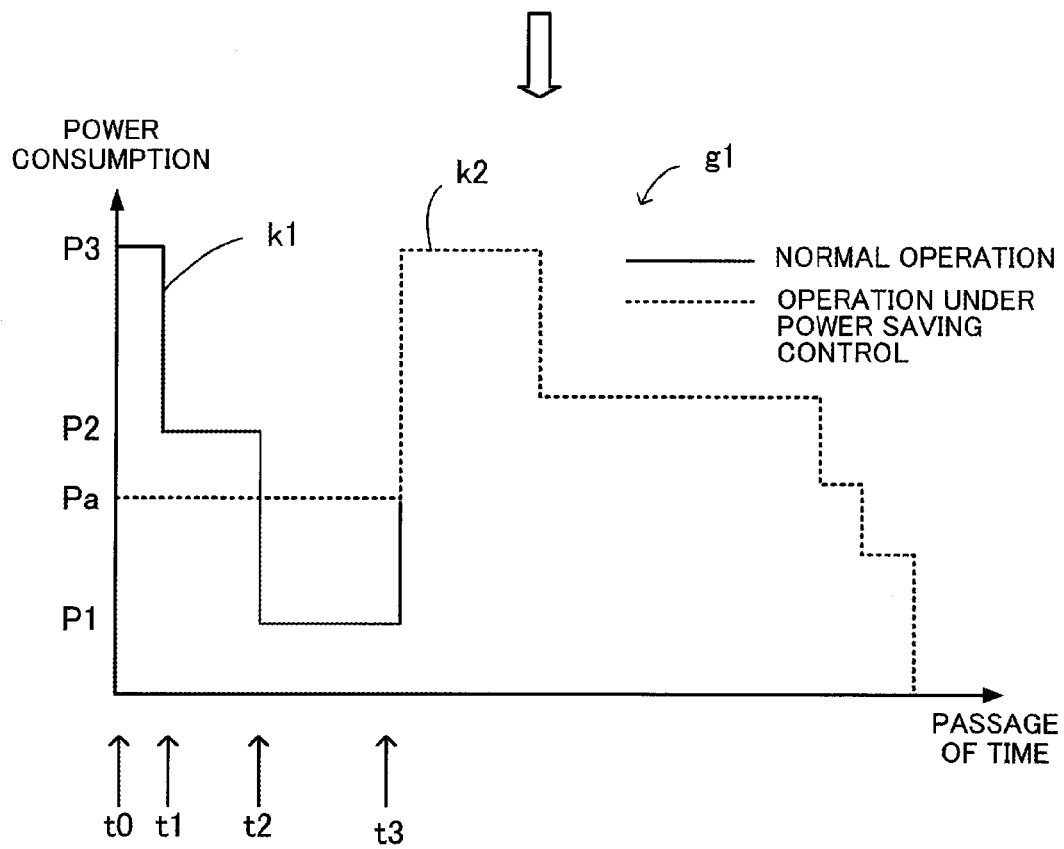

T5-1

| TIME | t0 | t1 | t2 | t3 | t4 | t5 | t6 | | | |
|---|---|---|---|---|---|---|---|---|---|---|
| POWER CONSUMPTION DIFFERENCE | +1500 | -320 | -430 | +200 | +480 | -1230 | -200 | BLANK | BLANK | BLANK |

FIG. 31

INFORMATION PROCESSING APPARATUS AND POWER SAVING CONTROL METHOD

CROSS-REFERENCE TO RELATED APPLICATION

This application is based upon and claims the benefit of priority of the prior Japanese Patent Application No. 2013-097649, filed on May 7, 2013, the entire contents of which are incorporated herein by reference.

FIELD

The embodiment discussed herein relates to an information processing apparatus and a power saving control method.

BACKGROUND

High Performance Computing (HPC) is a computing environment for achieving high speed processing of large-scale scientific computation and numeric computation and is widely used in various fields of study and development.

In addition, Personal Computer (PC) cluster technology is widely used for configuring HPC systems. This technology achieves high-speed computation by parallel processing, in which a plurality of PC nodes is connected to each other over a network, a large amount of calculation is divided, and then the PC nodes work on the calculation simultaneously.

For example, there has been proposed a conventional technique for achieving faster control performance by calculating how many times a high-speed processing function is executable in an idle time during which a slow-speed processing function is not executed and executing the high-speed processing function the calculated number of times at a regular interval.

A proposed technique for achieving low power consumption is to determine whether to perform high-speed processing, according to a data amount, and increase a clock frequency when performing the high-speed processing and decrease the clock frequency otherwise.

Another proposed technique is to change the driving conditions of a processor so as to obtain a processing speed suitable for a program execution state, and when the processor is overheated, change the driving conditions to reduce power consumption.

Please refer to Japanese Patent Laid-open Publications Nos. 08-202548, 05-27867, and 05-297993.

In an HPC system, a PC cluster or a plurality of other devices connected to each other is used to perform high-speed computation, as described above. In the existing HPC systems, however, each device operates at maximum power consumption for a long time, and therefore a plurality of devices may operate at maximum power consumption at the same time.

If this happens, for example, excessive power may be consumed instantaneously in a computing center as a whole, which may cause a power failure, such as power interruption.

SUMMARY

According to one aspect, there is provided an information processing apparatus that includes a processor configured to perform a procedure including detecting an idle time caused by job scheduling, and reducing an operating frequency for executing a job scheduled to be executed immediately before the idle time, below a maximum frequency.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates power reduction effect;

FIG. 31 illustrates a data structure of a power consumption table;

DESCRIPTION OF EMBODIMENTS

Figure 1:
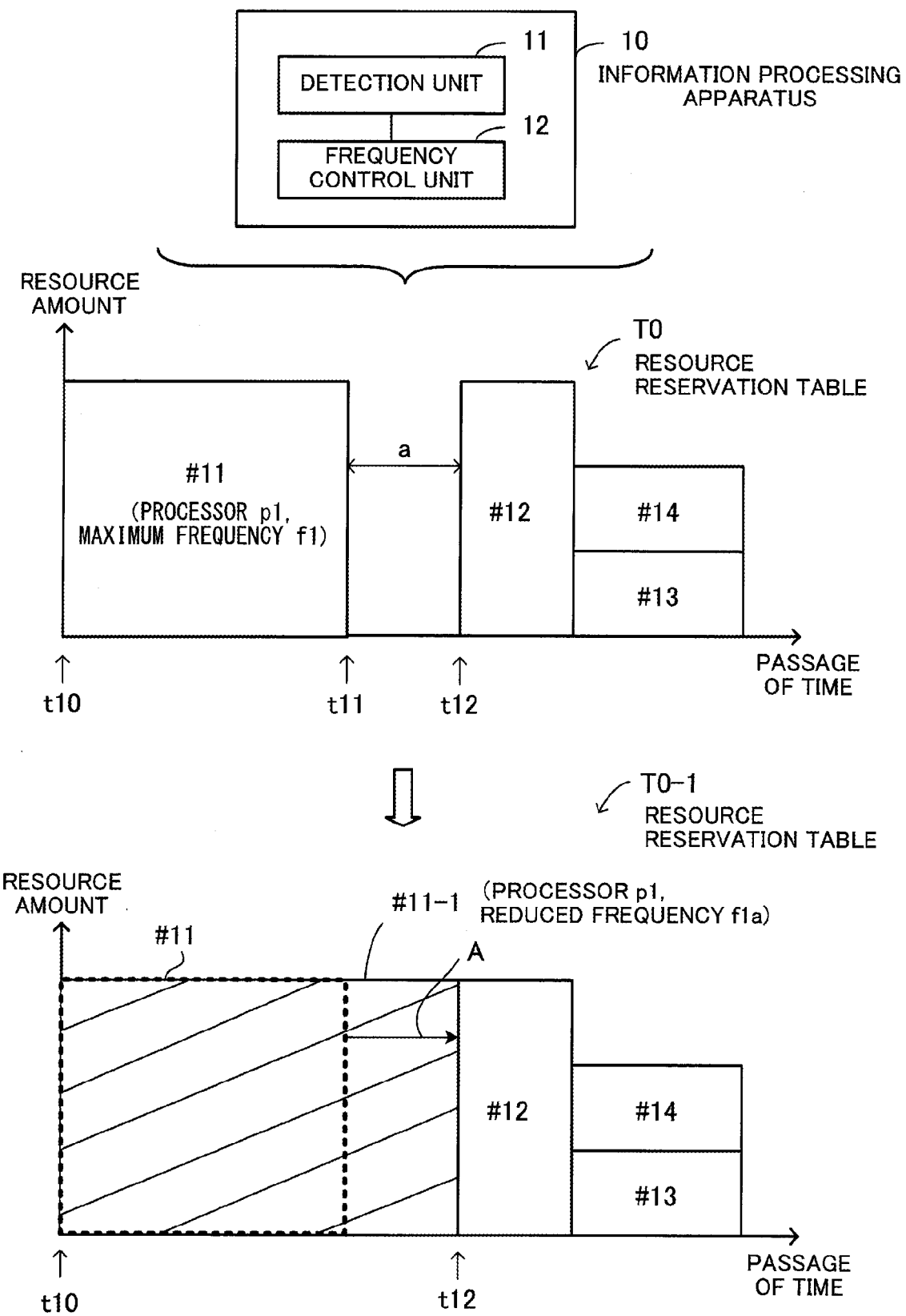
FIG. 1 illustrates an example of a configuration of an information processing apparatus.

An embodiment will be described below with reference to the accompanying drawings, wherein like reference numerals refer to like elements throughout. FIG. 1 illustrates an example of a configuration of an information processing apparatus. An information processing apparatus 10 includes a detection unit 11 and a frequency control unit 12 and is designed to activate power saving control and perform information processing.

The detection unit 11 detects an idle time of a processor caused by job scheduling. The frequency control unit 12 reduces the operating frequency of the processor for executing a job scheduled to be executed immediately before the idle time, below the maximum frequency.

Referring to FIG. 1, resource reservation tables are illustrated, in which the vertical axis represents a resource amount and the horizontal axis represents the passage of time. These resource reservation tables are tables (graphs) that manage, in time series, the amount of resources needed to execute jobs and are used in job scheduling.

In a resource reservation table T0 prior to execution of power saving control, a job #11 is taken as an executing job, and jobs #12 to #14 are taken as waiting jobs. In addition, prior to the execution of the power saving control, the job #11 is to be executed at the maximum frequency f1 of the processor p1 and is scheduled to be completed at time t11.

In this case, the processor p1 does not execute the job #11 during a time period from t11 to t12, and therefore this time period is an idle time of the processor p1 (taken as an idle time a).

Referring to a resource reservation table T0-1 at the time of the power saving control being executed, it is assumed that the detection unit 11 detects the above idle time a. When the idle time a is detected, the frequency control unit 12 reduces the operating frequency of the processor p1 for executing the job #11 scheduled to be executed immediately before the idle time a, below the maximum frequency f1.

At this time, the frequency control unit 12 reduces the operating frequency such that the execution time of the job is extended to the execution start time of a waiting job, which is included in the idle time.

More specifically, in this example, the frequency control unit 12 reduces the operating frequency such that the execution time of the job #11 is extended to the execution start time t12 of the waiting job #12, which is included in the idle time a.

The reduced operating frequency is taken as f1a (f1a<f1). The job #11 that is executed at the reduced operating frequency f1a is represented as a job #11-1 (indicated by a shaded block in FIG. 1).

That is, the job #11-1 has an execution time obtained by extending the execution time of the job #11 as indicted by an arrow A, and is executed at the operating frequency f1a by the processor p1 during a time period from t10 to t12 (the execution time is extended to time t12 because the job is executed at the operating frequency f1a).

As described above, when detecting an idle time of the processor in job scheduling, the information processing apparatus 10 reduces the operating frequency of the processor for executing a job scheduled to be executed immediately before the idle time, below the maximum frequency.

Thereby, the job is executed at a frequency below the maximum frequency, which makes it possible to reduce the time during which the maximum power is consumed and to equalize the power consumption (a reduction in power consumption will be described later with reference to FIG. 6).

The following describes the operation of this technique with reference to FIGS. 2 to 6. First, job scheduling will be described. In HPC, job (computation) scheduling is carried out so as to share a compute server and equally use computer resources among a plurality of PC clusters.

Figure 2:
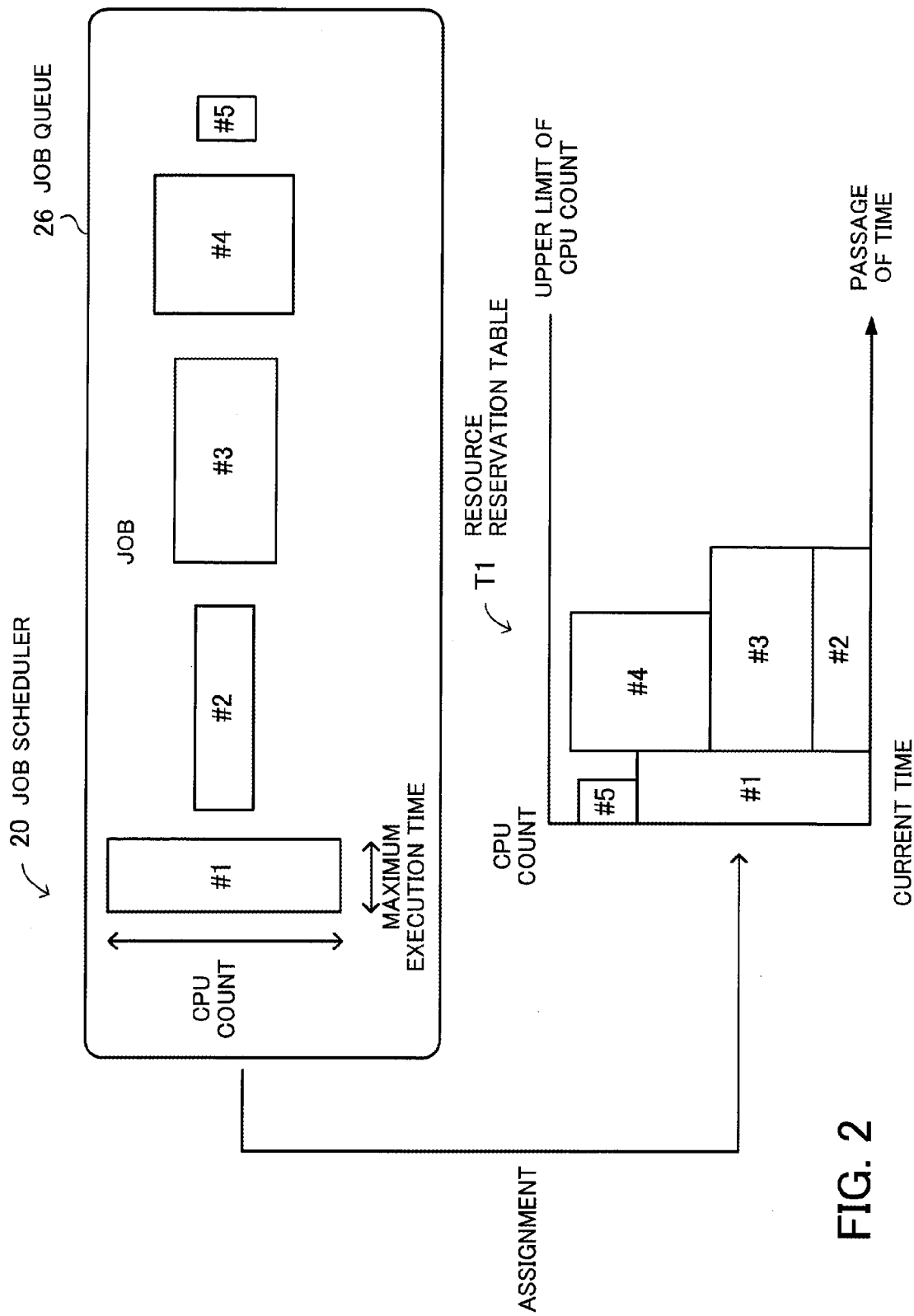
FIG. 2 is a model diagram for explaining an operation in job scheduling.

FIG. 2 is a model diagram for explaining an operation in job scheduling. A job scheduler 20 includes a job queue 26 and a resource reservation table T1. The job queue 26 stores jobs (queuing).

In the resource reservation table T1, the horizontal axis represents the passage of time and the vertical axis represents a Central Processing Unit (CPU) count indicating how many processors (CPUs) as resources are used to execute a single job, so that the resources are managed in time series (there is an upper limit on the CPU count).

Now, a single job is represented by a rectangle whose width and height correspond to the maximum execution time of the job and the number of CPUs needed to execute the job, respectively. Such rectangles are assigned in the resource reservation table T1 in the job scheduling.

In addition, the resource reservation table T1 is prepared for each different resource. For example, considering that there is a plurality of PC clusters CL1 to CLn as resources, the resource reservation table T1 is prepared for each of the PC clusters CL1, CL2, . . . , and CLn.

In the job queue 26, jobs are stored in order of priority. The job scheduling is performed by sequentially assigning the jobs in the resource reservation table T1 in order, starting with the first job of the job queue 26.

In addition, a job assigned to the current time turns into an executing job and is executed as a computational resource. Referring to FIG. 2, jobs #1 and #5 are assigned to the current time, and therefore these jobs #1 and #5 are taken as executing jobs. The other jobs #2, #3, and #4 are taken as waiting jobs.

Figure 3:
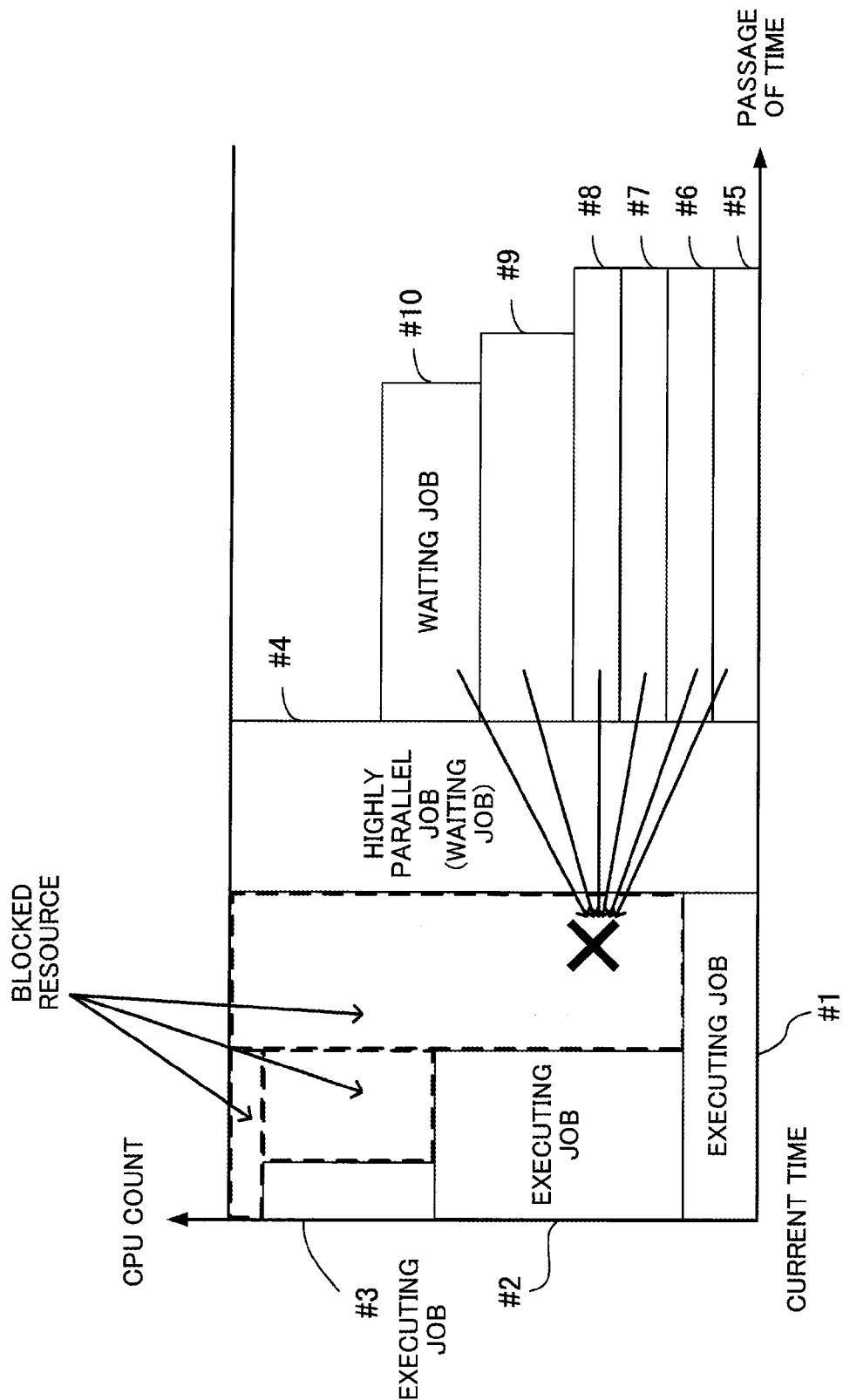
FIG. 3 is a diagram for explaining a blocked resource.

The following describes a blocked resource. FIG. 3 is a diagram for explaining a blocked resource. It is assumed that executing jobs #1 to #3 are assigned to the current time and that waiting jobs #4 to #10 are assigned after the jobs #1 to #3. In addition, it is also assumed that the waiting job #4 is a highly parallel job, which is executed using many CPUs in parallel.

This highly parallel job #4 blocks the subsequent waiting jobs #5 to #10 that are queuing in the job queue 26, which makes resources unavailable for the waiting jobs #5 to #10. Such unavailable resources are collectively referred to as a blocked resource. The blocked resource exists in an idle time during which CPUs do not operate.

Figure 4:
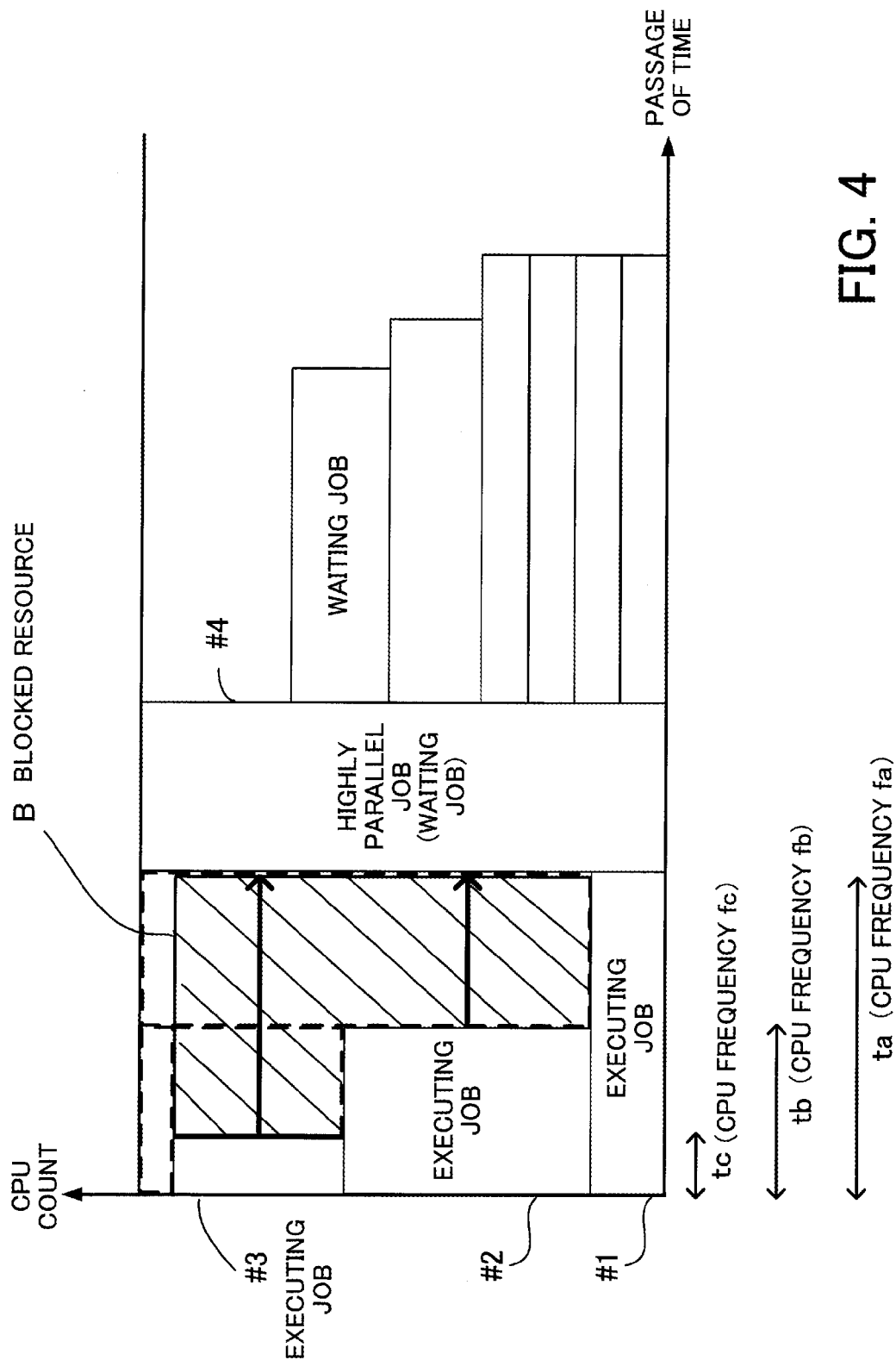
FIG. 4 is a diagram for explaining an operation to be performed when a CPU frequency is reduced.

The following describes power saving control of detecting a blocked resource and reducing a CPU frequency. FIG. 4 is a diagram for explaining an operation to be performed when a CPU frequency is reduced. The job scheduler 20 detects based on the resource management data of the resource reservation table T1 whether a blocked resource exists or not.

When detecting a blocked resource, the job scheduler 20 reduces the CPU frequency for an executing job by the use of the blocked resource (by the use of the idle time of CPUs). At this time, the CPU frequency is reduced such that the execution time of the executing job is extended, using the blocked resource, to such a time as not to delay the execution start times of subsequent waiting jobs.

Referring to the example of FIG. 4, it is assumed that a blocked resource B (indicated by a shaded portion of FIG. 4) exists between the executing jobs #2 and #3 and the waiting job #4. It is also assumed that the CPU frequency for the job #2 during a time period tb is fb.

When the power saving control is performed, a CPU frequency fa is determined for reducing the CPU frequency fb such that the execution time of the job #2 is extended, using the blocked resource B, to such a time as not to delay the execution start time of the waiting job #4.

More specifically, the job #2, which is scheduled to be executed at the CPU frequency fb in the time period tb before the power saving control is performed, is changed to be executed at the CPU frequency fa (<fb) in a time period to (>tb) by the power saving control.

Similarly, it is assumed that the CPU frequency for the job #3 in a time period tc is fc. When the power saving control is performed, the CPU frequency fa is determined for reducing the CPU frequency fc such that the execution time of the job #3 is extended, using the blocked resource B, to such a time as not to delay the execution start time of the waiting job #4.

More specifically, the job #3, which is scheduled to be executed at the CPU frequency fc in the time period tc before the power saving control is performed, is changed to be executed at the CPU frequency fa (<fc) in the time period to (>tc) by the power saving control.

Figure 5:
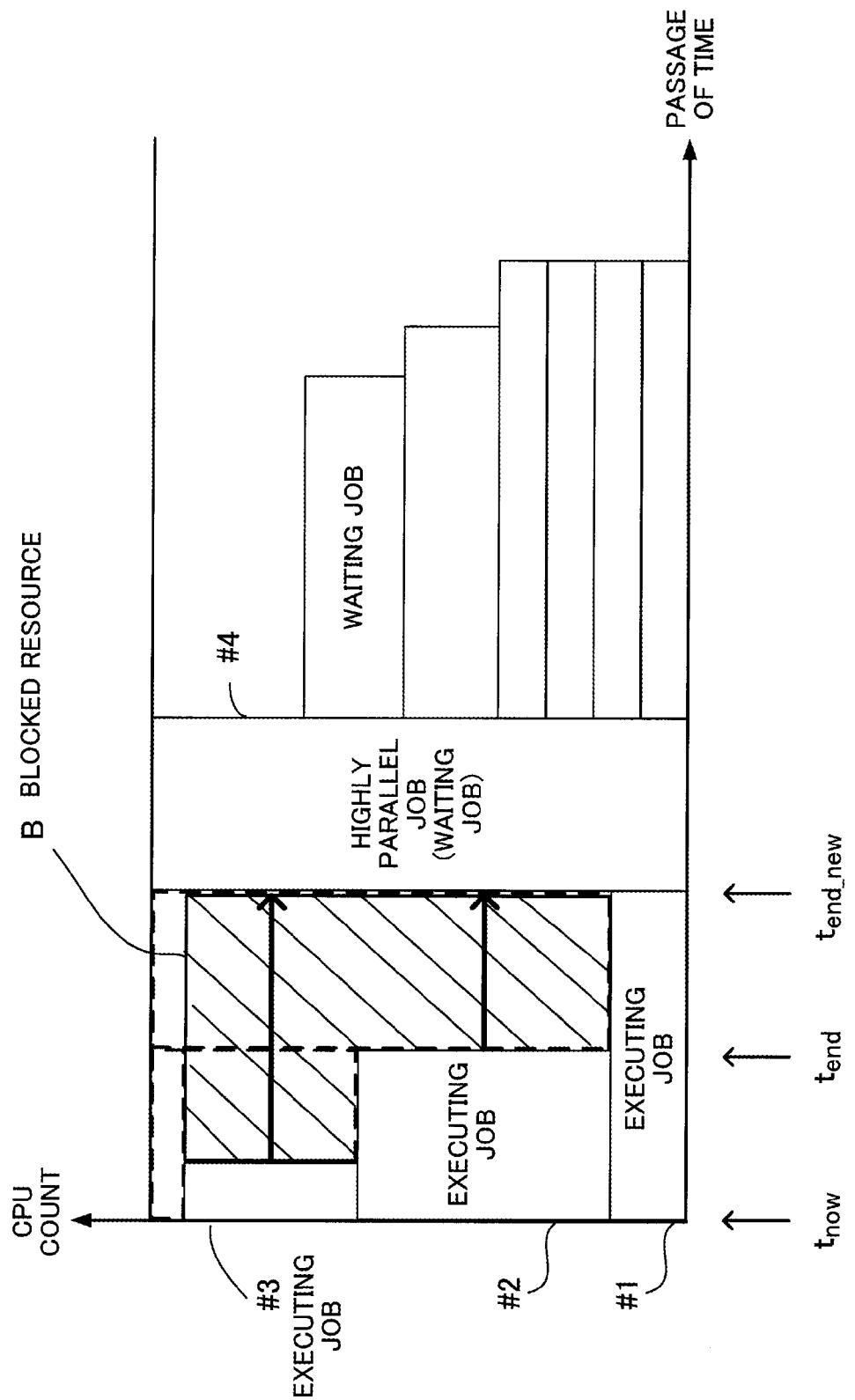
FIG. 5 illustrates parameters to be used in an equation for calculating a CPU frequency.

The following describes how to calculate a CPU frequency. FIG. 5 illustrates parameters to be used in an equation for calculating a CPU frequency. It is assumed that a CPU frequency for the job #2 under the power saving control is to be calculated. A CPU frequency before being changed is taken as $F_{old}$, the current time is taken as $t_{now}$, an original job end time of the job #2 prior to extension of the execution time thereof is taken as $t_{end}$, a new job end time of the job #2 after the extension of the execution time thereof is taken as $t_{end\_new}$, and a CPU frequency dependence coefficient is taken as C. The scheduler 20 calculates a new CPU frequency $F_{new}$ with the following equation (1).

$$F_{new}=(t_{end}-t_{now}-C(t_{end}-t_{now}))/(t_{end\_new}-t_{now}-C(t_{end}-t_{now}))\times F_{old} \quad (1)$$

In this connection, the CPU frequency dependence coefficient C is 0<C<1. The CPU frequency dependence coefficient C becomes closer to zero when a job is CPU bound and becomes closer to one when the job is memory bound or I/O bound.

In this way, in order to determine how much to reduce a CPU frequency, a new CPU frequency is calculated using the dependence of hardware elements that execute a job, i.e., the new CPU frequency varies depending on whether the job is CPU bound, or memory bound or I/O bound. This makes it possible to appropriately calculate a CPU frequency suitable for the characteristics of the job.

In this connection, each compute node 3-1 to 3-n is allowed to have discrete CPU frequencies available. For example, the compute node 3-1 has a plurality of discrete CPU frequencies, 2.9, 2.5, 2.1, 1.7, and 1.3 (GHz), and one of them is set.

Therefore, when a CPU frequency is calculated with the equation (1), a CPU frequency closer to the calculation result is set in a compute node. For example, when 2.87 . . . (GHz) is calculated, the compute node 3-1 selects and sets 2.9 (GHz) as its own CPU frequency.

The following describes power reduction effect. FIG. 6 illustrates power reduction effect. Illustrated is a power reduction graph g1 corresponding to the resource reservation table T1 of FIG. 4. In the graph g1, the vertical axis represents power consumption and the horizontal axis represents the passage of time.

In addition, in the graph g1, a solid line k1 represents the power consumption that is needed in normal operation in which the CPU frequencies for the jobs #2 and #3 are not reduced and their execution times are not extended. A broken line k2 represents the power consumption that is needed in operation under power saving control in which the CPU frequencies for the jobs #2 and #3 are reduced and their execution times are extended.

In the normal operation, P3 denotes a power consumption amount used for executing the jobs #1 to #3 during a time period from t0 to t1. P2 denotes a power consumption amount used for executing the jobs #1 and #2 during a time period from t1 to t2. P1 denotes a power consumption amount used for executing the job #1 during a time period from t2 to t3.

On the other hand, in the operation under the power saving control, the CPU frequencies for the jobs #2 and #3 are reduced and their execution times are extended to time t3. Extension of the execution times to time t3 is equivalent to reducing the CPU frequencies for the jobs #2 and #3 to the same CPU frequency as that for the job #1 which is to be completed at time t3.

Therefore, during a time period from t0 to t3, the jobs #1 to #3 consume the same power, and a power consumption amount Pa is used. As a result, during a time period under the power saving control, the peak power is reduced and the power consumption is equalized.

The reduction in a CPU frequency by the use of a blocked resource, as described above, makes it possible to reduce the time during which the maximum power is consumed for operation and to thereby reduce the peak power consumption.

In addition, a CPU frequency is reduced such that the execution time of an executing job is extended, using a blocked resource, to such a time as not to delay the execution start times of subsequent waiting jobs. Since there is no delay in starting the execution of the subsequent jobs, it is possible to equalize the power consumption and to secure the overall performance (throughput) of the system.

Figure 7:
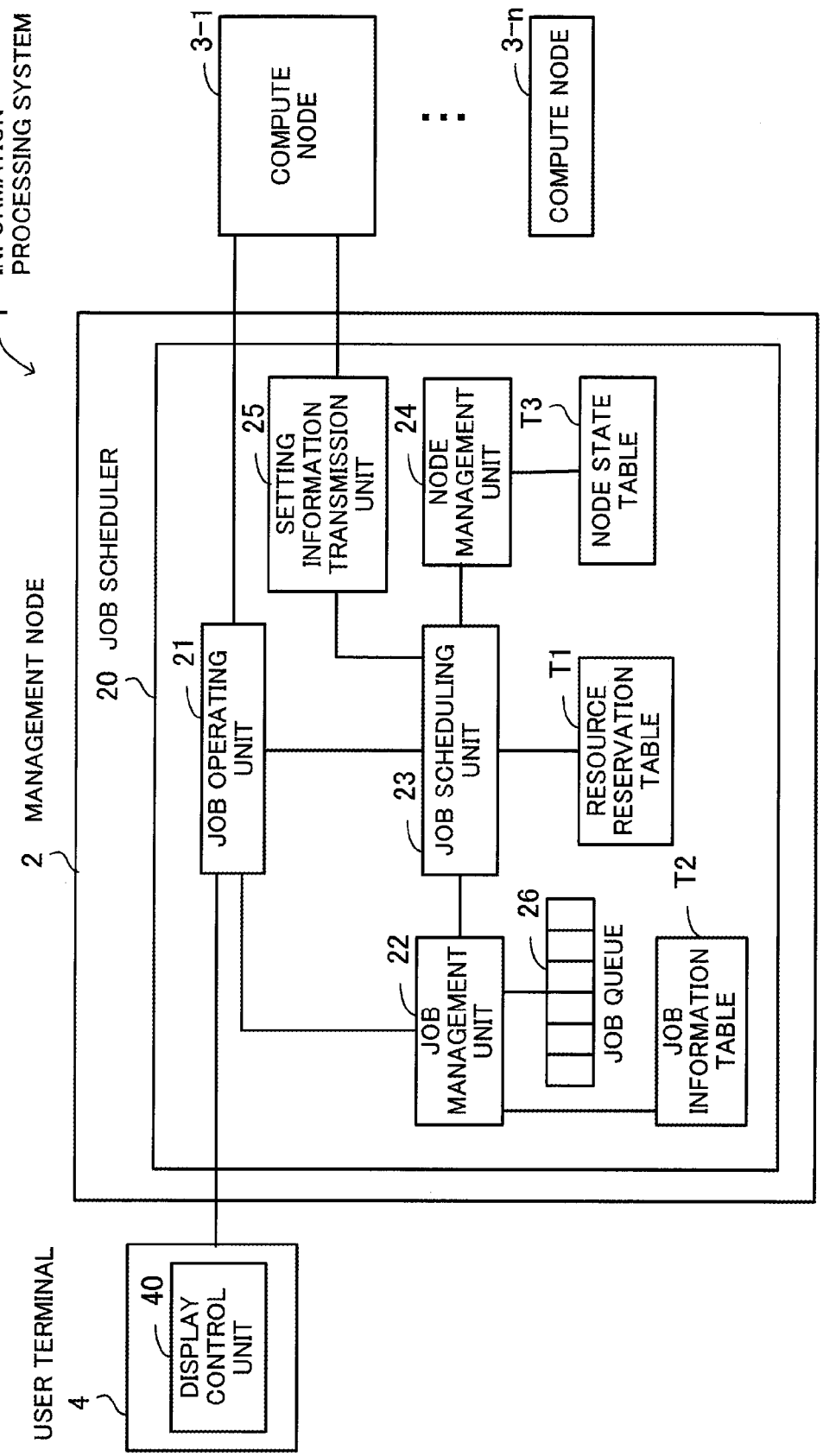
FIG. 7 illustrates an example of a configuration of an information processing system.

The following describes the overall configuration of a system including the information processing apparatus 10. FIG. 7 illustrates an example of a configuration of an information processing system. An information processing system 1 includes a management node 2, compute nodes 3-1 to 3-n, and a user terminal (terminal device) 4.

The management node 2 corresponds to the information processing apparatus 10 of FIG. 1 and includes a job scheduler 20. The user terminal 4 includes a display control unit 40 (which will be described later with reference to FIG. 26 and subsequent drawings).

The job scheduler 20 includes a job operating unit 21, a job management unit 22, a job scheduling unit 23, a node management unit 24, a setting information transmission unit 25, a job queue 26, a resource reservation table T1, a job information table T2, and a node state table T3. The job scheduling unit 23 has the same functions as the detection unit 11 and frequency control unit 12 of FIG. 1.

The job operating unit 21 is connected to the user terminal 4 and the compute nodes 3-1 to 3-n and is designed to control an interface with the user terminal 4 and also to control interfaces with the compute nodes 3-1 to 3-*n*. The job management unit 22 manages the job queue storing jobs and the job information table T2 containing job information.

The job scheduling unit 23 performs job scheduling using the resource reservation table T1, and periodically performs power saving control. The node management unit 24 manages the node state table T3 containing information on the states of the compute nodes 3-1 to 3-*n*. The setting information transmission unit 25 sends information on settings determined by the management node 2, to the compute nodes 3-1 to 3-*n*. For example, information on a CPU frequency for each of the compute nodes 3-1 to 3-*n*, calculated by the management node 2, is sent.

Figure 8:
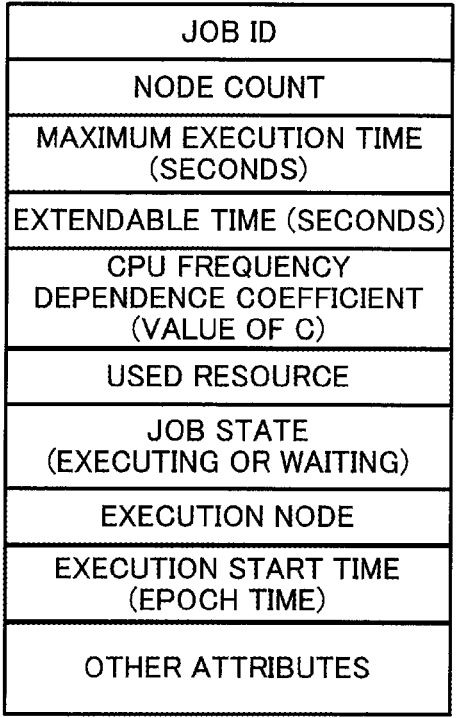
FIG. 8 illustrates an example of a structure of a job information table.

The following describes the job information table T2. FIG. 8 illustrates an example of a structure of a job information table. The job information table T2 contains job information to be used for scheduling jobs stored in the job queue 26.

The job information table T2 includes fields for Job ID, Node Count, Maximum Execution Time (seconds), Extendable Time (seconds), CPU Frequency Dependence Coefficient, Used Resource, Job State, Execution Node, Execution Start Time (epoch time), and Other Attributes.

The Job ID field contains the identification information of a job. The Node Count field indicates how many compute nodes (CPUs) are used to execute the job. The Maximum Execution Time field indicates a maximum execution time needed for executing the job, and a desired maximum execution time may be set by a user when the job is submitted.

The Extendable Time field indicates a maximum time for which the execution time of the job is extendable in order to reduce the CPU frequency by the use of a blocked resource. In this connection, the extendable time is set to zero when the job is submitted.

The CPU Frequency Dependence Coefficient field contains the value of C in the equation (1), which is described earlier. This value varies depending on whether the job execution is CPU bound or memory bound. By substituting the value contained in this field into the equation (1), a CPU frequency suitable for the characteristics of the job is calculated.

The Used Resource field contains the identification information of a resource that executes the job. Different jobs use different resources. For example, one job uses a PC cluster as one resource, while another job uses a super computer as one resource. That is, in this Used Resource field, information indicating which resource is used to execute the job is registered.

The Job State Field contains information indicating whether the job is in executing state or waiting state. The Execution Node field contains the identification information of the compute nodes that execute the job. The Execution Start Time field indicates the execution start time of the job, which is represented in, for example, epoch time.

Figure 9:
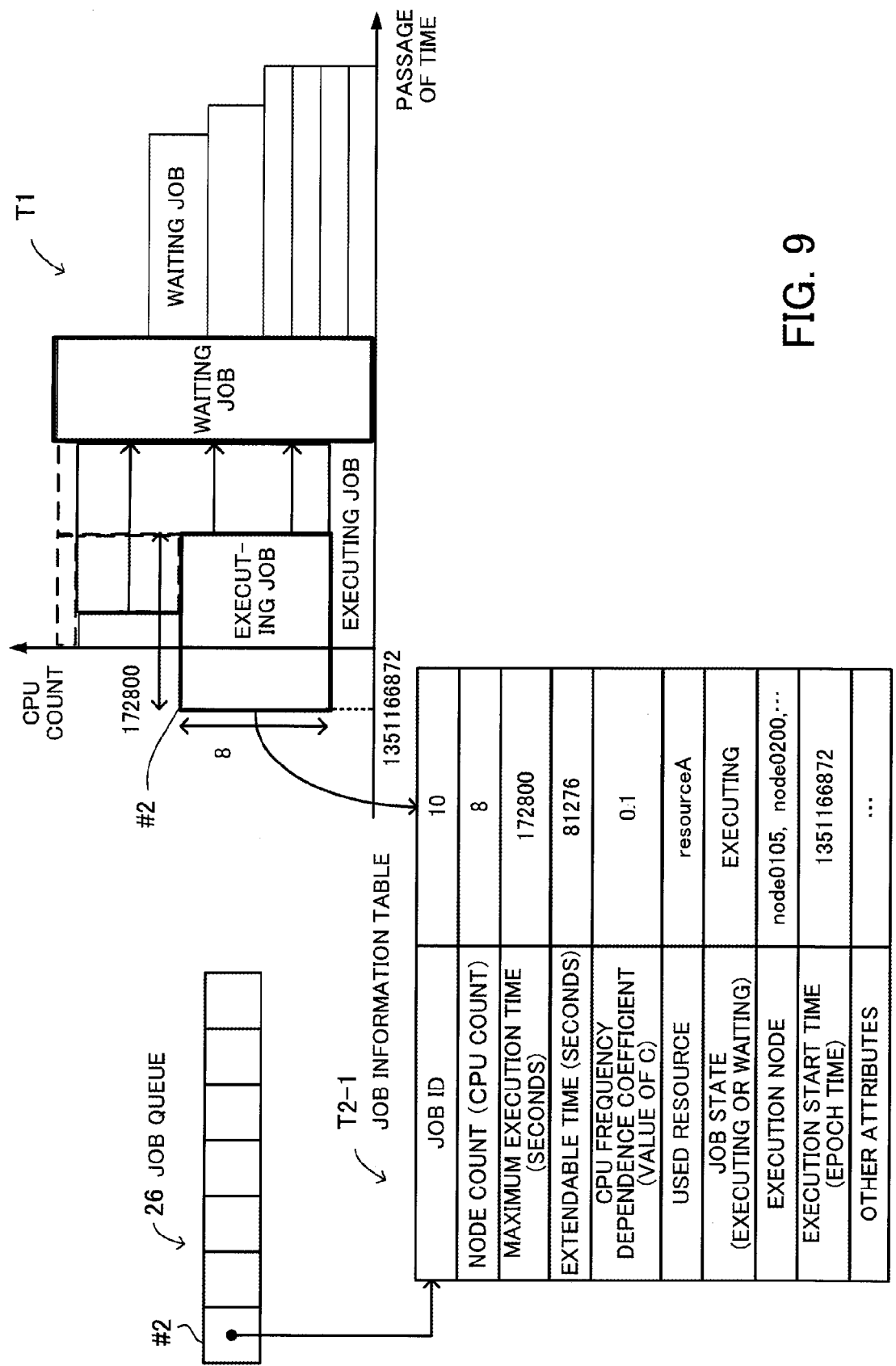
FIGS. 9 and 10 illustrate specific examples of job information.
Figure 10:
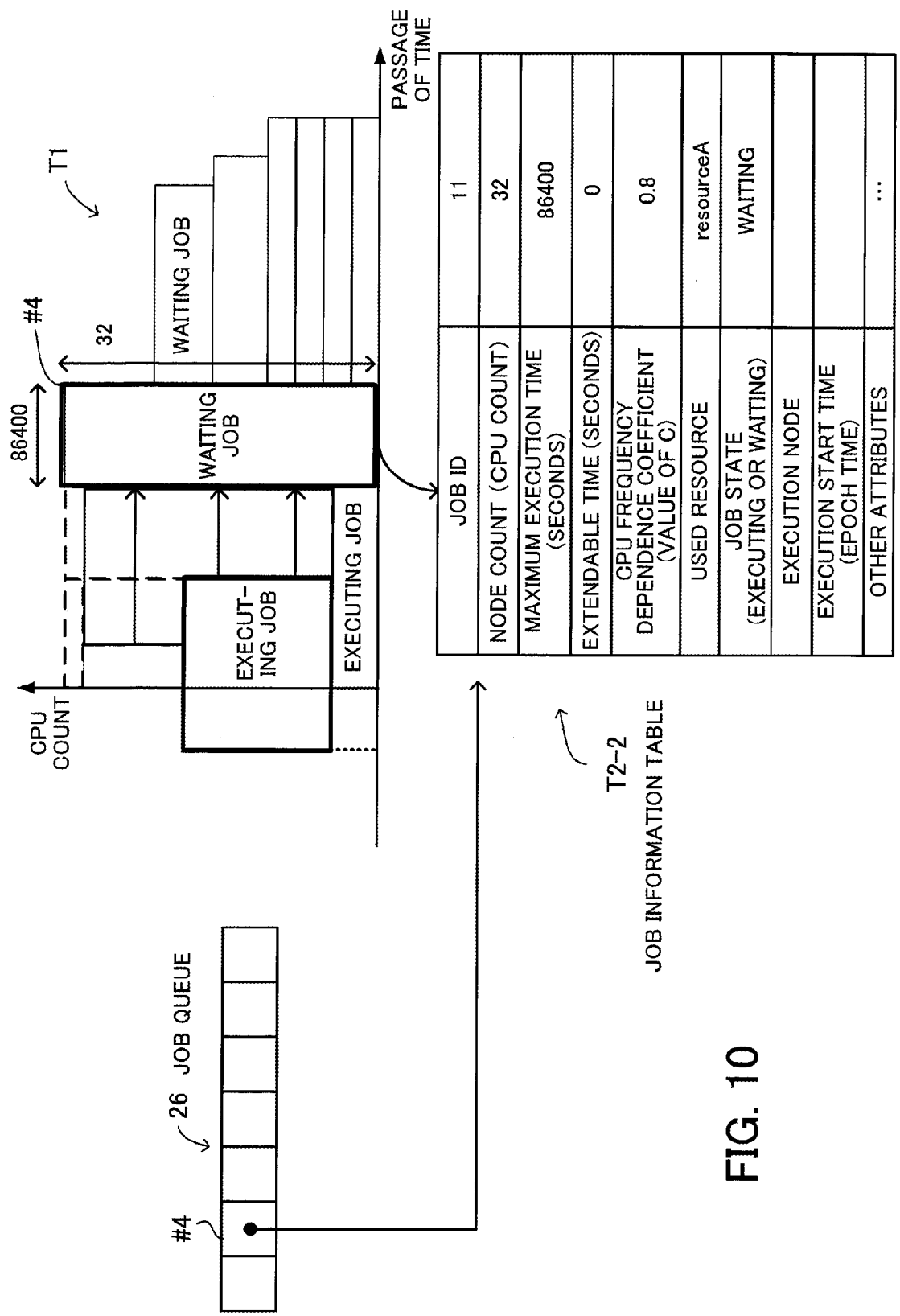

FIGS. 9 and 10 illustrate specific examples of job information. A job information table T2-1 of FIG. 9 contains the job information on the job #2 stored in the job queue 26. The job information on the job #2 includes a job ID of "10", a node count of "8", a maximum execution time of "172800", an extendable time of "81276", a CPU frequency dependence coefficient of "0.1" (CPU bound), a used resource of "resource A", a job state of "executing", execution nodes of "node0105, node0200, . . . " and an execution start time of "1351166872". In this connection, in FIG. 9, such job information is indicated in a corresponding portion of the resource reservation table T1.

A job information table T2-2 of FIG. 10 contains the job information on the job #4 stored in the job queue 26. The job information on the job #4 includes a job ID of "11", a node count (CPU count) of "32", a maximum execution time of "86400", an extendable time of a CPU frequency dependence coefficient of "0.8" (memory bound or I/O bound), a used resource of "resource A", and a job state of "waiting". In this connection, in FIG. 10, such job information is indicated in a corresponding portion of the resource reservation table T1.

Figure 11:
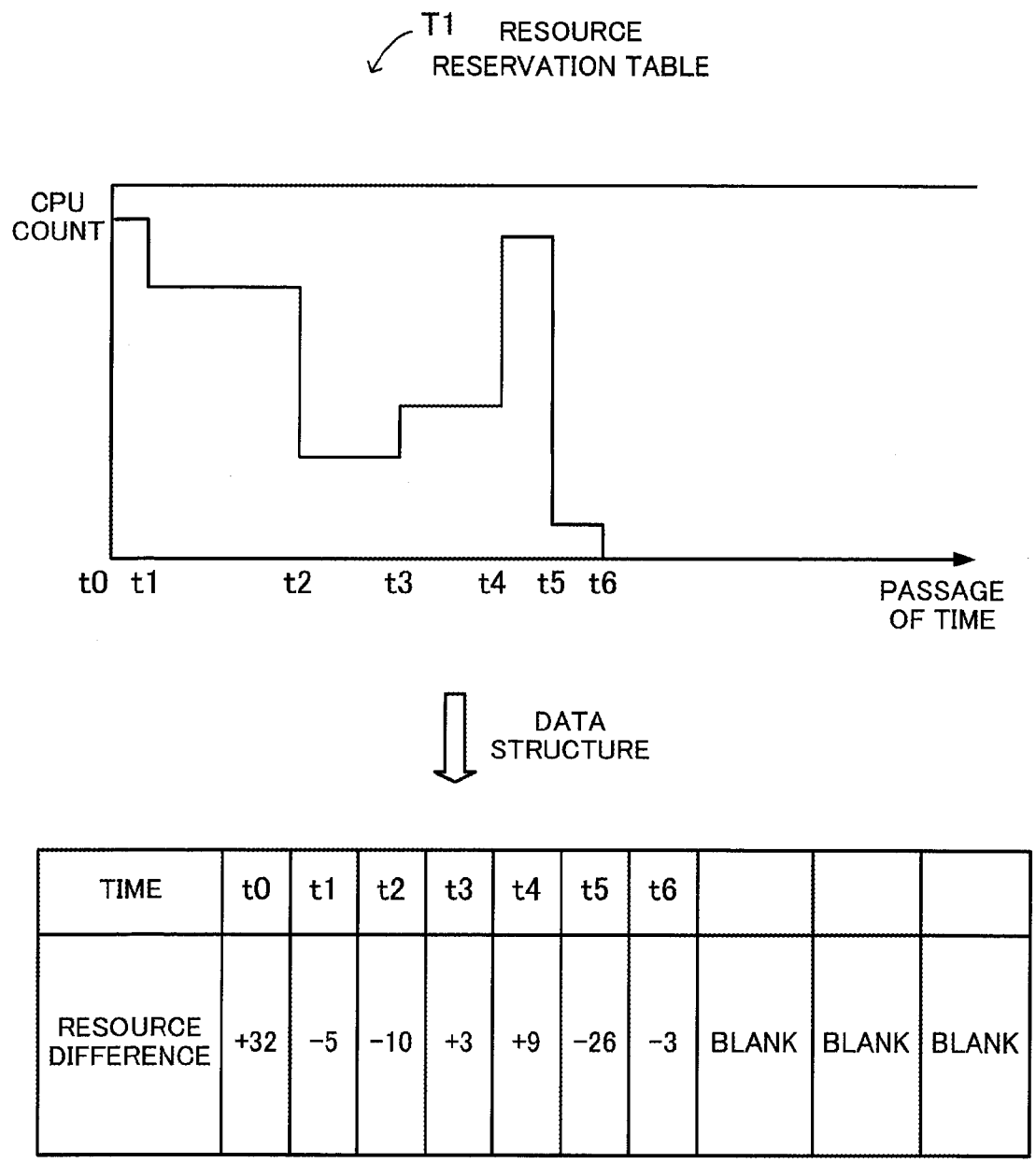
FIG. 11 illustrates a data structure of a resource reservation table.

The following describes a data structure of the resource reservation table T1. FIG. 11 illustrates a data structure of a resource reservation table. The resource reservation table T1 manages an increase or decrease in the amount of resources for each time period.

For example, assuming that an increase in the amount of resources in a time period from t0 to t1 is 32, the amount of resources in a time period from t1 to t2 is decreased by 5 from that in the time period from t0 to t1, and the amount of resources in a time period from t2 to t3 is decreased by 10 from that in the time period from t1 to t2. In this way, the increase or decrease (difference) in the amount of resources for each time period is managed.

Figure 12:
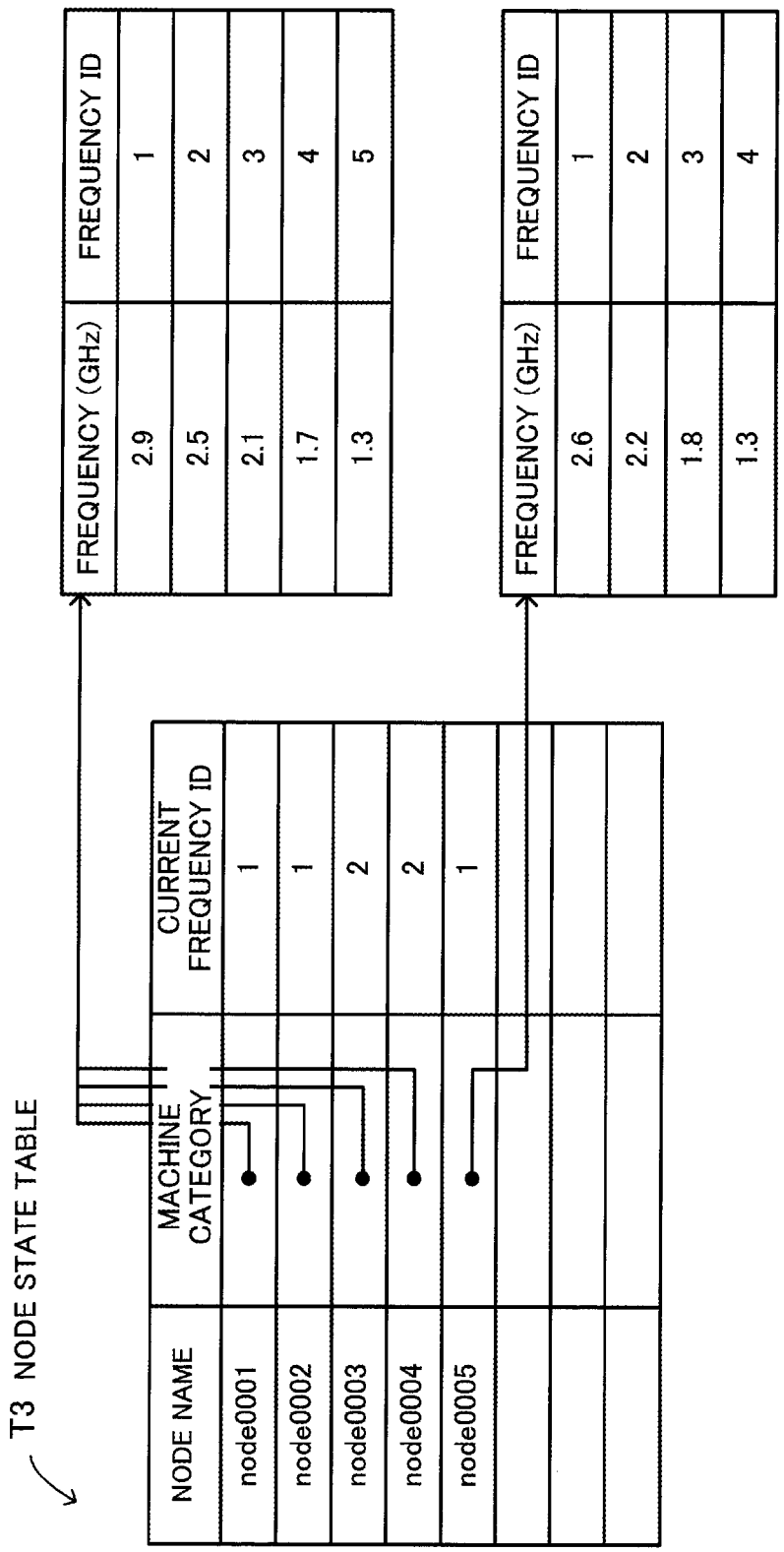
FIG. 12 illustrates an example of a structure of a node state table.

The following describes the node state table T3. FIG. 12 illustrates an example of a structure of a node state table. The node state table T3 manages the CPU operating frequencies of the individual compute nodes 3-1 to 3-*n*.

The node state table T3 includes the following fields: Node Name, Machine Category, and Current Frequency ID. The Node Name field contains the identification information of a compute node. The Machine Category field contains information on CPU frequencies that are available for the compute node, which includes frequencies (GHz) and frequency IDs. The Current Frequency ID field contains information indicating a currently selected frequency ID.

For example, with respect to a compute node having a node name of "node0001", frequencies of 2.9, 2.5, 2.1, 1.7, and 1.3 (GHz) are currently available and their respective frequency IDs are 1 to 5. Referring to FIG. 12, the current frequency ID of "1" is registered, and therefore it is recognized that a frequency of 2.9 (GHz) is currently set.

Similarly, with respect to a compute node having a node name of "node0005", frequencies of 2.6, 2.2, 1.8, and 1.3 (GHz) are currently available and their respective frequency IDs are 1 to 4. Referring to FIG. 12, the current frequency ID of is registered, and therefore it is recognized that a frequency of 2.6 (GHz) is currently set.

Figure 13:
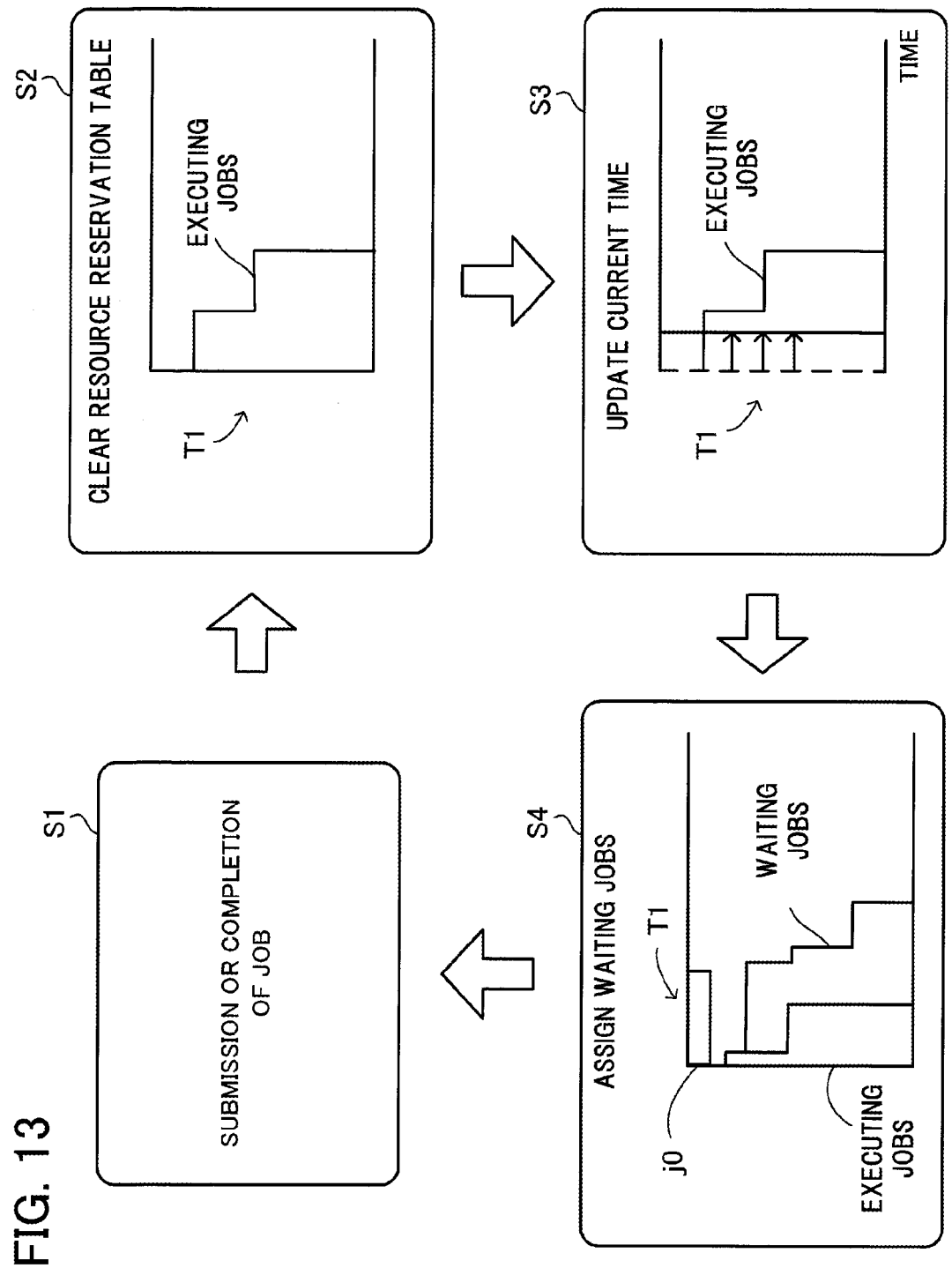
FIG. 13 illustrates an overall flow of job scheduling.

The following describes an overall flow of job scheduling. FIG. 13 illustrates an overall flow of job scheduling.

(S1) The job scheduling unit 23 detects submission or completion of a job.

(S2) The job scheduling unit 23 clears the assignment of resources which are assigned to times prior to the time of the submission or completion of the job from the resource reservation table T1.

(S3) The job scheduling unit 23 updates the current time of the resource reservation table T1.

(S4) The job scheduling unit 23 sequentially assigns waiting jobs in the resource reservation table T1. At this time, for example, a waiting job j0 assigned to the current time turns into an executing job. Then, the flow returns back to step S1.

Figure 14:
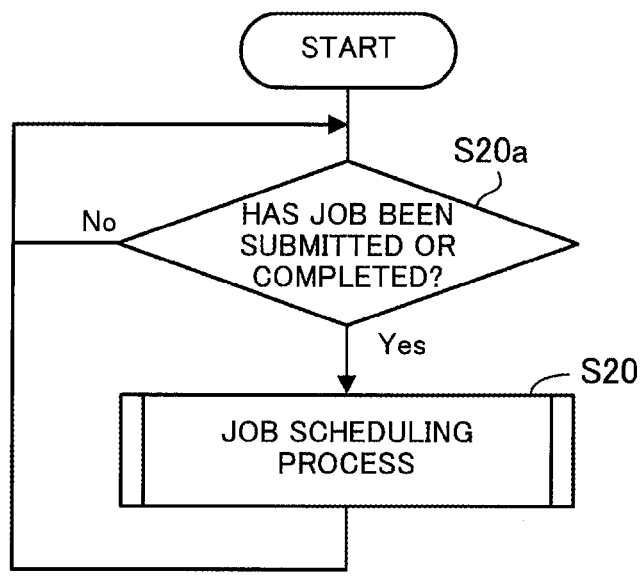
FIG. 14 is a flowchart illustrating an operation in job scheduling.
Figure 15:
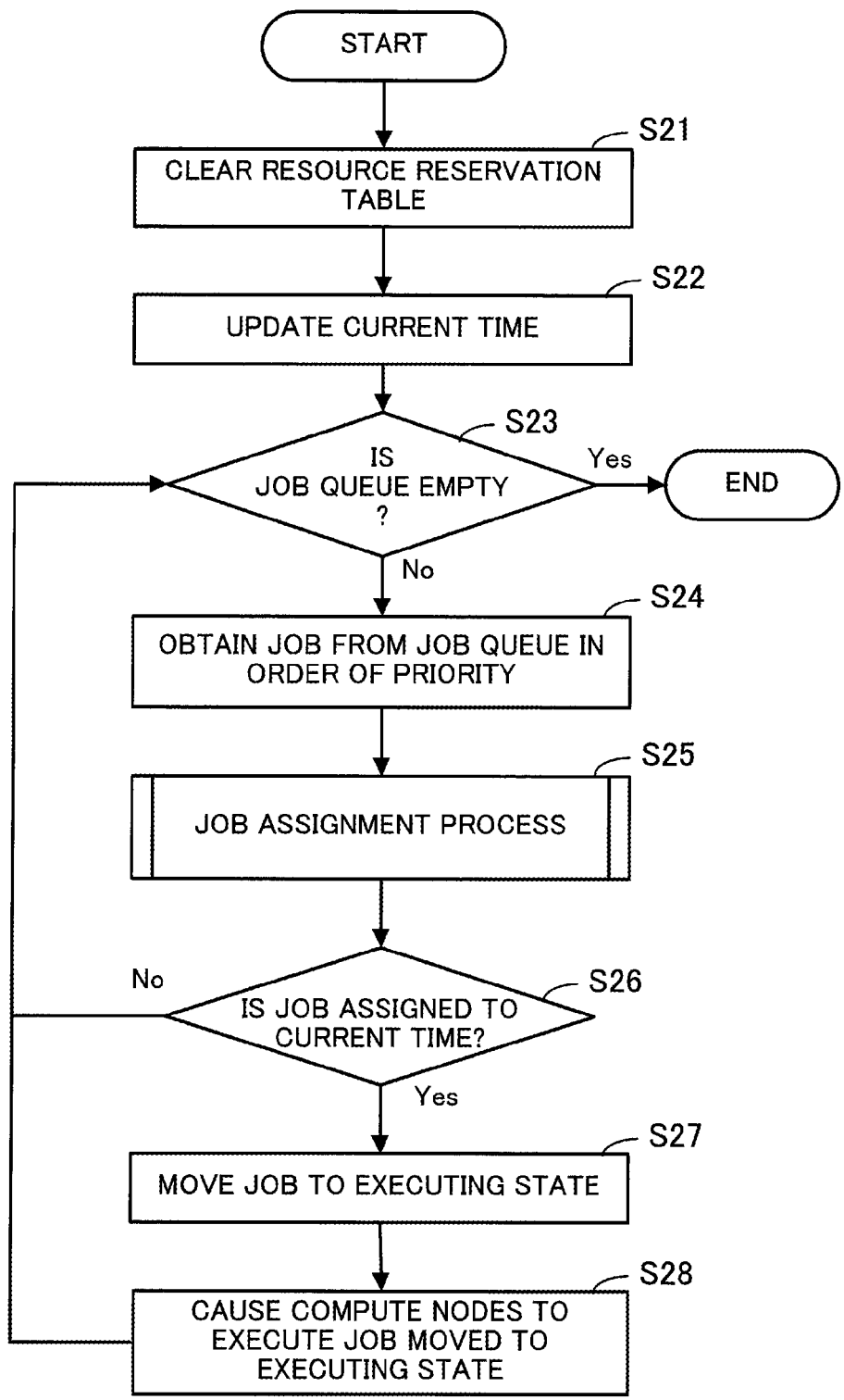
FIG. 15 is a flowchart illustrating an operation of a job scheduling process.
Figure 16:
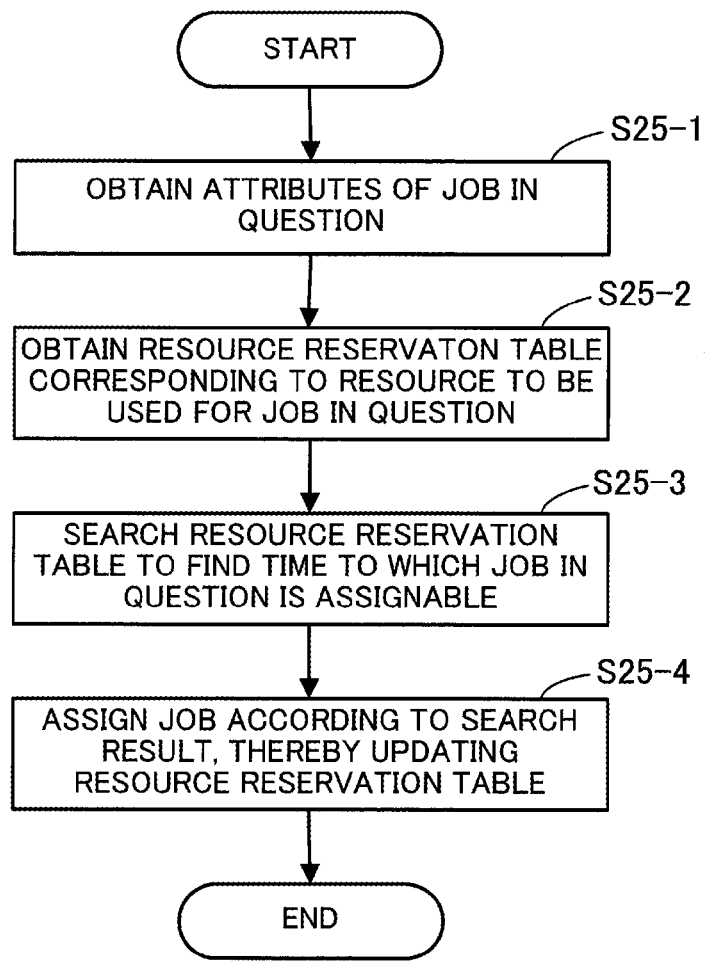
FIG. 16 is a flowchart illustrating a job assignment process.

The following describes a flow of the job scheduling operation with reference to FIGS. 14 to 16. FIG. 14 is a flowchart illustrating an operation in job scheduling.

(S20*a*) The job scheduling unit 23 determines whether a job has been submitted or completed. If such an event is detected, the operation proceeds to step S20. Otherwise, this step S20*a* is repeated.

(S20) The job scheduling unit 23 performs a job scheduling process.

FIG. 15 is a flowchart illustrating an operation of a job scheduling process. This flowchart describes how to execute step S20 of FIG. 14 in detail.

(S21) The job scheduling unit 23 clears a resource reservation table T1.

(S22) The job scheduling unit 23 updates the current time of the resource reservation table T1.

(S23) The job scheduling unit 23 determines whether the job queue 26 is empty or not. If no job is stored in the job queue 26, the operation is completed. If there are jobs in the queue 26, the operation proceeds to step S24.

(S24) The job scheduling unit 23 obtains a job from the job queue 26 in order of priority.

(S25) The job scheduling unit 23 assigns the obtained job in the resource reservation table T1.

(S26) The job scheduling unit 23 determines whether the job is assigned to the current time in the resource reservation table T1 or not. If the job is assigned to the current time, the operation proceeds to step S27. Otherwise, the operation proceeds to step S23.

(S27) The job scheduling unit 23 moves the job assigned to the current time to an executing state.

(S28) The job moved to the executing state is executed by corresponding compute nodes.

FIG. 16 is a flowchart of a job assignment process. This flowchart describes how to execute step S25 of FIG. 15 in detail.

(S25-1) The job scheduling unit 23 obtains the attributes (maximum execution time, node count, used resource, and so on.) of a job to be assigned, from the job information table T2

(S25-2) The job scheduling unit 23 recognizes a resource to be used for the job to be assigned, and obtains a resource reservation table T1 corresponding to the resource.

(S25-3) The job scheduling unit 23 searches the obtained resource reservation table T1 to find a time to which the job in question is assignable and which is the closest to the current time.

(S25-4) The job scheduling unit 23 assigns the job in question according to the search result in the resource reservation table T1, thereby updating the resource reservation table T1.

Figure 17:
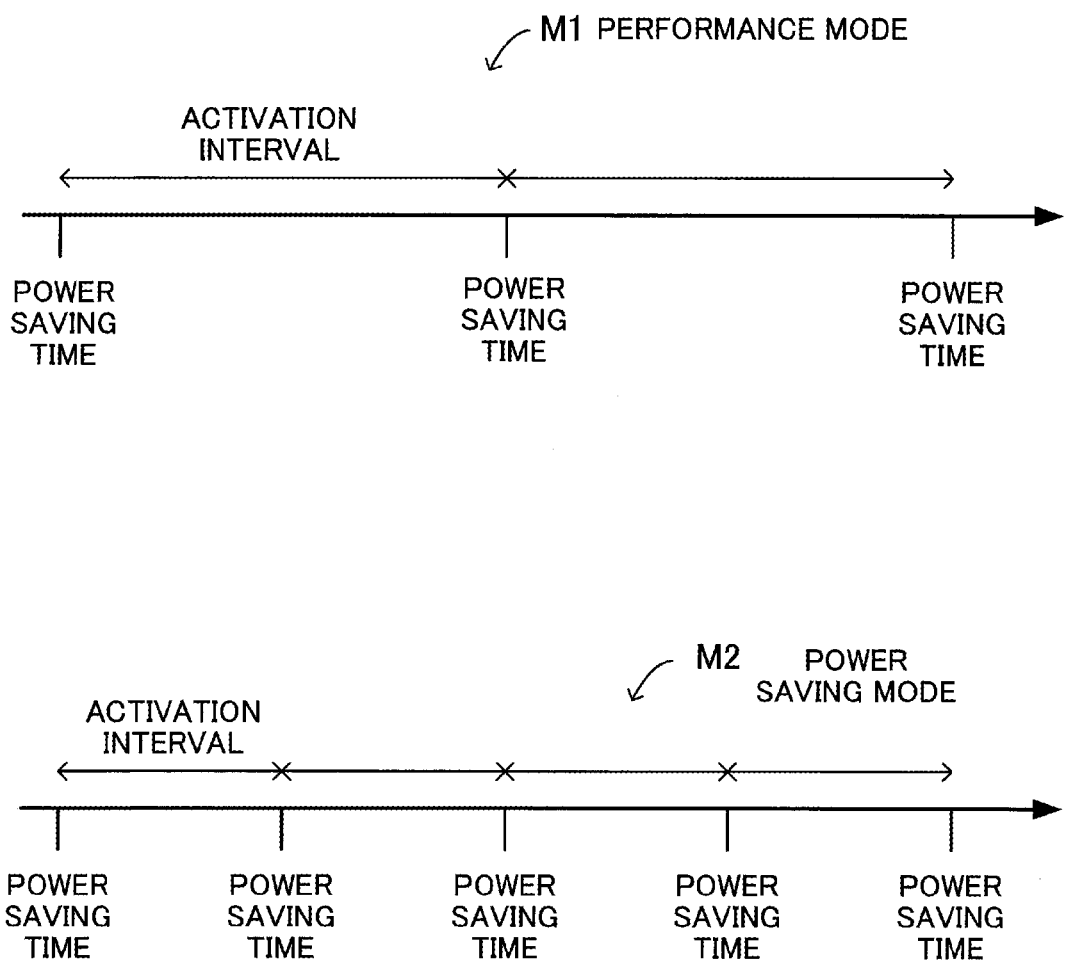
FIG. 17 illustrates activation intervals of power saving control.

The following describes an activation interval of power saving control. FIG. 17 illustrates activation intervals of power saving control. The above-described power saving control is periodically activated, and its activation interval (power saving interval) varies depending on an operation mode of the information processing system 1. In this connection, the power saving control is executed at each power saving time in FIG. 17.

The information processing system 1 has two operation modes: a performance mode M1 and a power saving mode M2. The performance mode M1 is for performing computation with high performance by decreasing the number of times of execution of power saving control in a given time period. The power saving mode M2 is for performing computation while reducing power consumption by increasing the number of times of execution of power saving control in the given time period.

Therefore, the activation interval in the performance mode M1 is set longer than that in the power saving mode M2. Conversely, the activation interval in the power saving mode M2 is set shorter than that in the performance mode M1.

Figure 18:
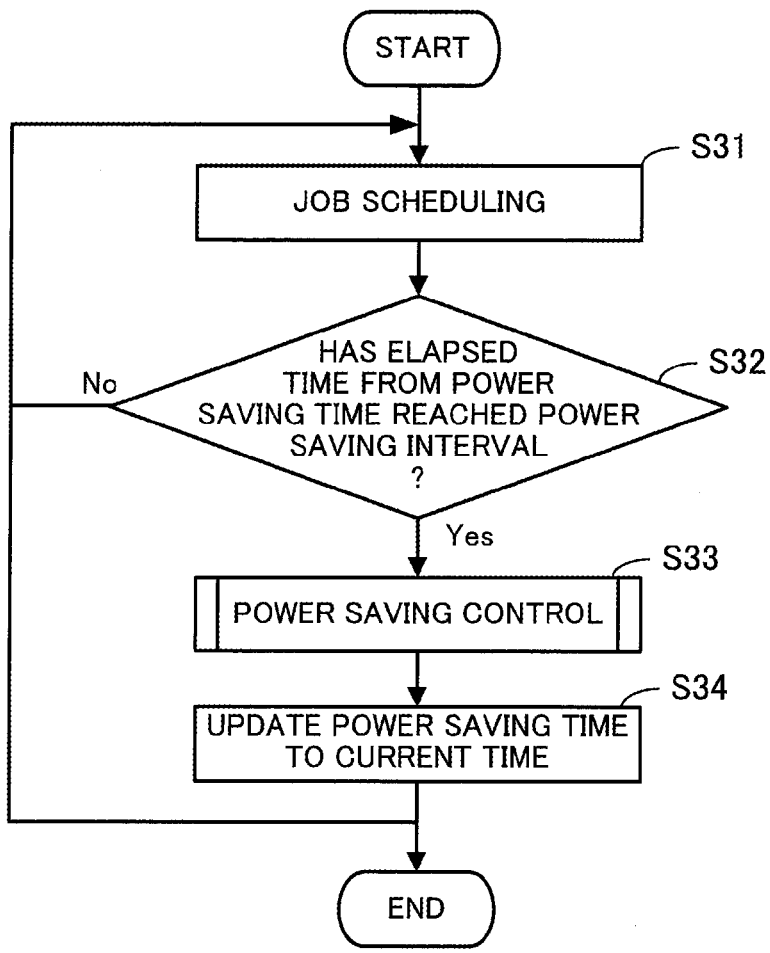
FIG. 18 is a flowchart illustrating an operation to be performed when power saving control is performed at an activation interval.

FIG. 18 is a flowchart illustrating an operation to be performed when power saving control is performed at an activation interval.

(S31) The job scheduling unit 23 performs a job scheduling process.

(S32) The job scheduling unit 23 determines whether the elapsed time from a power saving time has reached the activation interval (power saving interval) or not. If the elapsed time has reached the activation interval, the operation proceeds to step S33. Otherwise, the operation proceeds back to step S31.

(S33) The job scheduling unit 23 performs a power saving control process.

(S34) The job scheduling unit 23 updates the power saving time to the current time. Then, the operation proceeds back to step S31.

Figure 19:
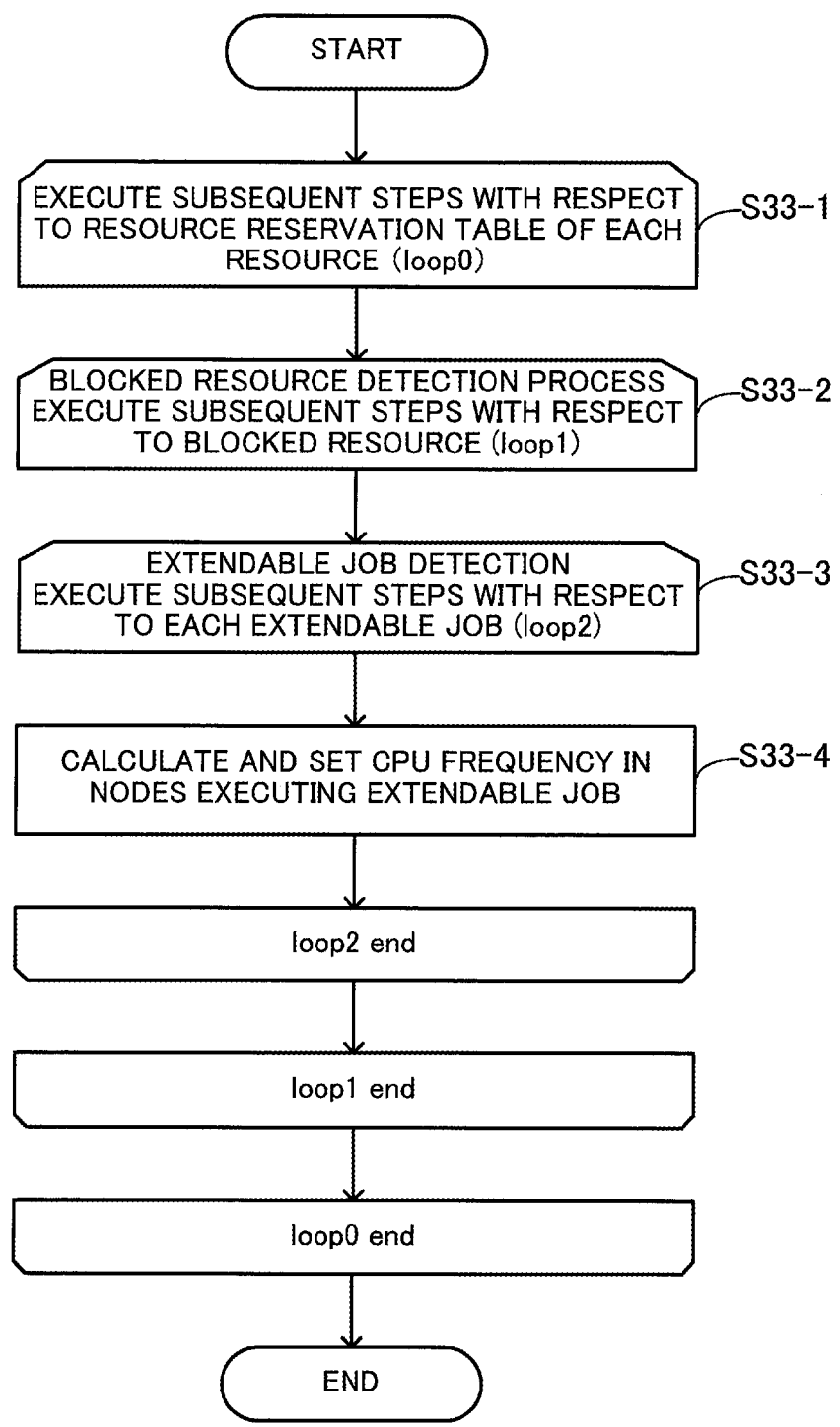
FIG. 19 is a flowchart illustrating an operation of a power saving control process.

FIG. 19 is a flowchart illustrating an operation of a power saving control process. This flowchart describes how to execute step S33 of FIG. 18.

(S33-1) The job scheduling unit 23 executes step S33-2 and subsequent steps with respect to the resource reservation table T1 of each resource.

(S33-2) The job scheduling unit 23 performs a blocked resource detection process (idle time detection process) with respect to the resource reservation table T1 of each resource.

(S33-3) The job scheduling unit 23 detects an extendable job on the basis of the detected blocked resource.

(S33-4) The job scheduling unit 23 calculates and sets a CPU frequency for the detected extendable job.

Figure 20:
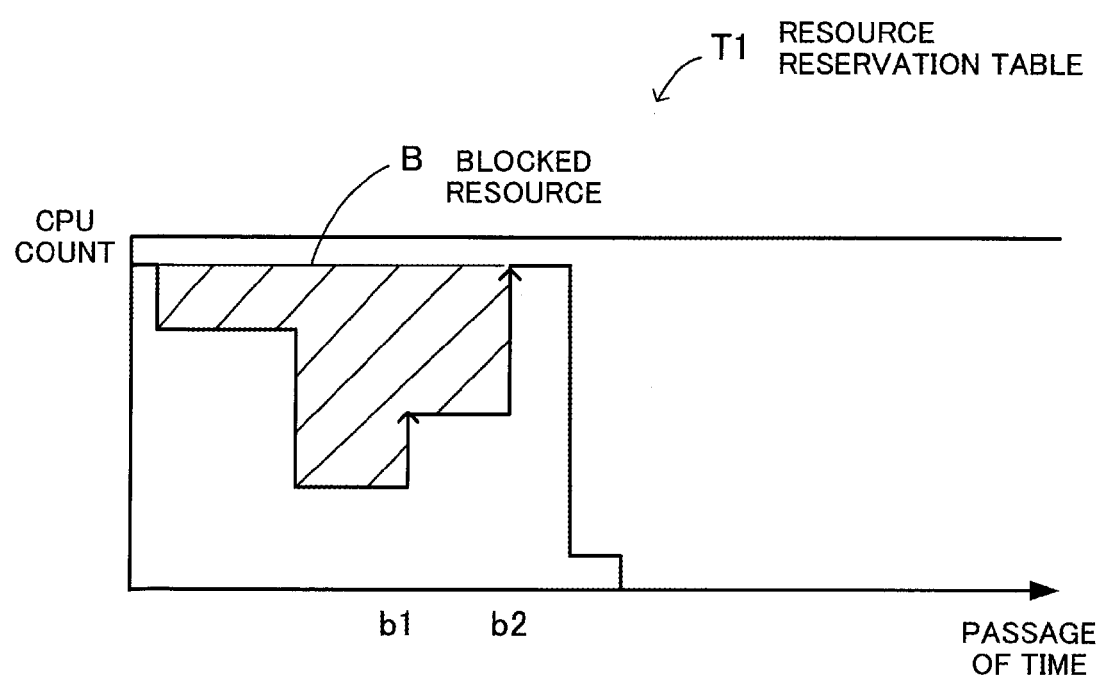
FIG. 20 is a diagram for explaining an operation for detecting a blocked resource.

The following describes a blocked resource detection process. FIG. 20 is a diagram for explaining an operation for detecting a blocked resource. The resource reservation table T1 manages an increase or decrease in the amount of resources for each time period, as illustrated in FIG. 11, and as illustrated in FIG. 20, a blocked resource B is considered to exist prior to an increase in the amount of resources.

Therefore, the job scheduling unit 23 searches the resource reservation table T1 in ascending order of time to find times b1 and b2 at which the amount of resources increases (hereinafter, these times are referred to as blocked resource detected times), thereby recognizing the existence of the blocked resource B.

As described above, a blocked resource is detected by searching the resource reservation table T1, which manages an increase or decrease in the amount of resources for executing jobs in time series, to find times at which the amount of resources increases. Therefore, it is possible to easily recognize existence of the blocked resource through the job scheduling.

Figure 21:
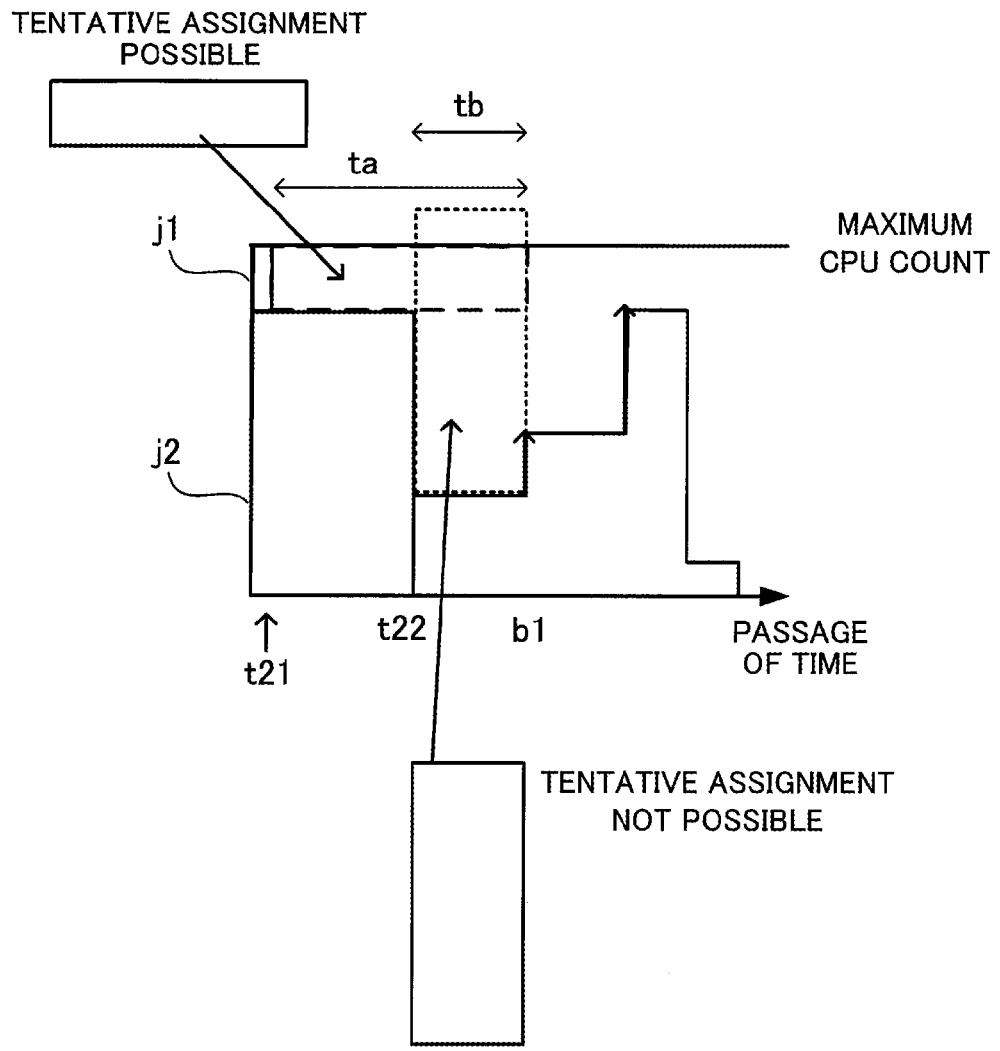
FIG. 21 is a diagram for explaining an operation for detecting an extendable job.

The following describes a process of detecting an extendable job. FIG. 21 is a diagram for explaining an operation for detecting an extendable job. When detecting a blocked resource, the job scheduling unit 23 creates a tentative extension resource for an increase in the use of the used resource so as to extend the execution of a job under execution to a blocked resource detected time. The tentative extension resource is represented by a rectangle whose size corresponds to the number of CPUs and the extension time for the job under execution.

In this connection, the extension time is a time period from the scheduled end time of the job under execution to the blocked resource detected time. After creating the tentative extension resource, the job scheduling unit 23 tentatively assigns the tentative extension resource to the scheduled end time of the job in question in the resource reservation table T1.

If the tentative assignment of the tentative extension resource does not exceed the maximum CPU count (maximum resource amount) defined in the resource reservation table T1, the job scheduling unit 23 determines that the job corresponding to the tentative extension resource is an extendable job.

For example, with respect to the job j1, a tentative extension resource is created based on the number of CPUs used for the job j1 and an extension time ta. The extension time ta is a time period from the scheduled end time t21 of the job j1 to the blocked resource detected time b1. In this example, since the assignment of the tentative extension resource in the resource reservation table T1 does not exceed the maximum CPU count of the resource reservation table T1, the job j1 is determined to be an extendable job using the blocked resource.

On the other hand, with respect to the job j2, a tentative extension resource is created based on the number of CPUs for the job j2 and an extension time tb. The extension time tb is a time period from the scheduled end time t22 of the job j2 to the blocked resource detected time b1. In this example, since the assignment of the tentative extension resource in the resource reservation table T1 exceeds the maximum CPU count of the resource reservation table T1, the job j2 is determined not to be an extendable job using the blocked resource.

Figure 22:
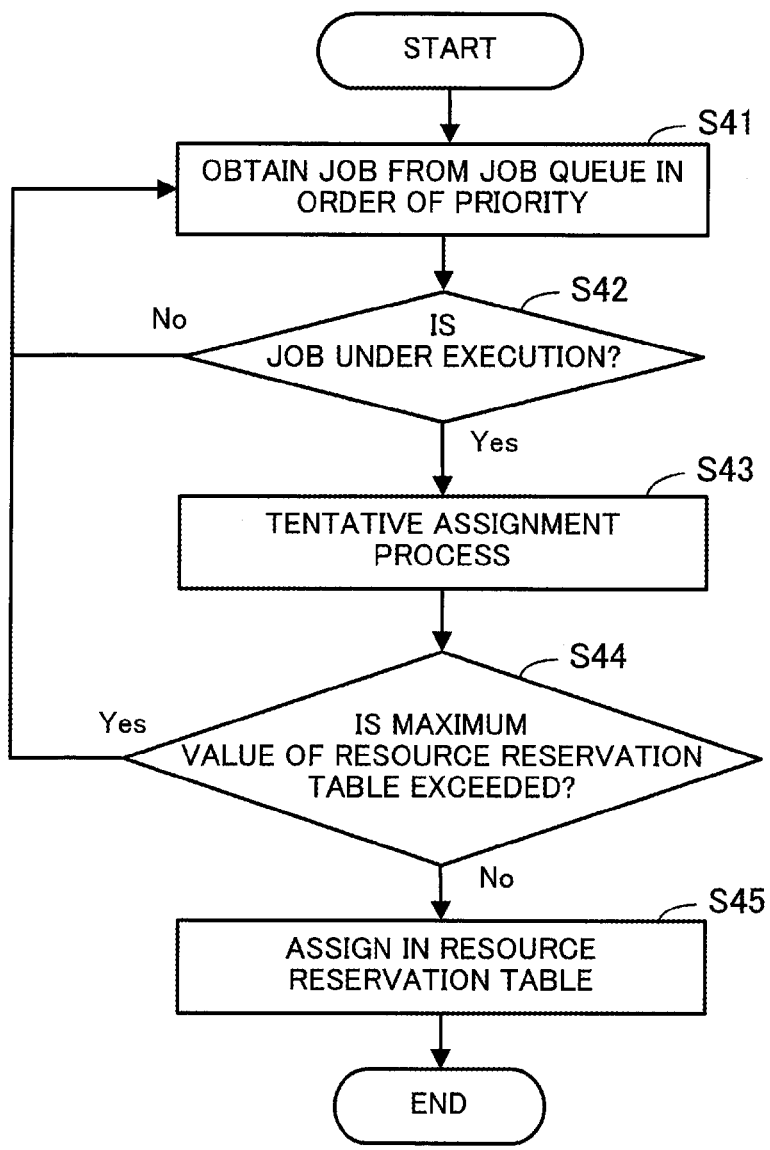
FIG. 22 is a flowchart illustrating an operation of an extendable job detection process.

FIG. 22 is a flowchart illustrating an operation of an extendable job detection process.

(S41) The job scheduling unit 23 obtains a job from the job queue 26 in order of priority.

(S42) The job scheduling unit 23 determines whether the obtained job is under execution or not. If the job is under execution, the operation proceeds to step S43. Otherwise, the operation proceeds back to step S41.

(S43) The job scheduling unit 23 creates a tentative extension resource for the job in question, and tentatively assigns the tentative extension resource in the resource reservation table T1.

(S44) The job scheduling unit 23 determines whether the tentative assignment exceeds the maximum value of the resource reservation table T1 or not. If the tentative assignment does not exceed the maximum value, the operation proceeds to step S45. Otherwise, the operation proceeds back to step S41.

(S45) The job scheduling unit 23 assigns the created extension resource in the resource reservation table T1.

As described above, the job scheduling unit 23 creates a tentative extension resource on the basis of the number of CPUs and a time period from the scheduled end time of a job to a time at which the amount of resources increases, and tentatively assigns the tentative extension resource to the scheduled end time of the job in the resource reservation table T1. Then, if the assignment does not exceed the maximum CPU count of the resource reservation table T1, the job is determined to be an extendable job.

Thereby, in the power saving control, it is possible to accurately recognize an extension time for a job for which the CPU frequency may possibly be reduced. Therefore, it is possible to assign an extension job without affecting the throughput of other jobs.

Figure 23:
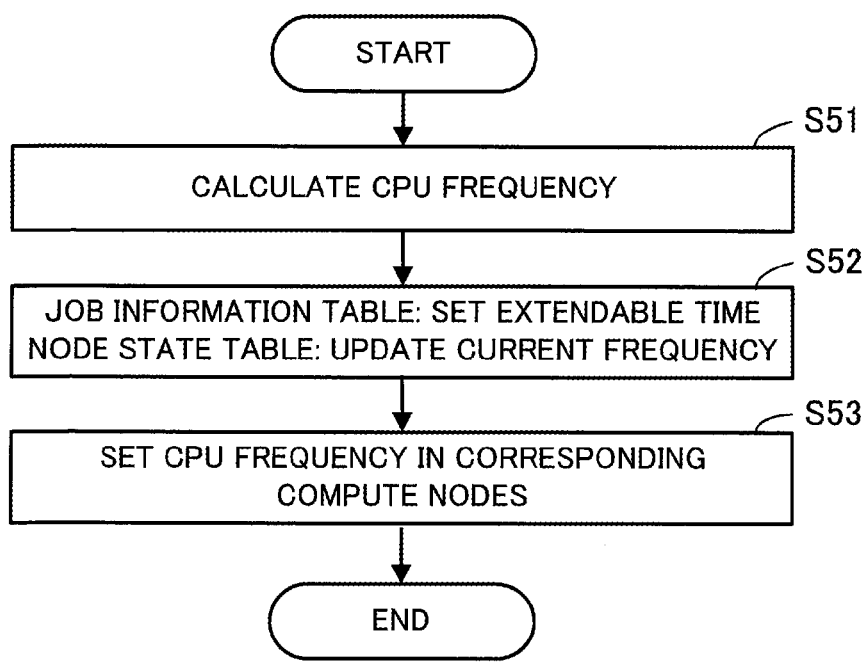
FIG. 23 is a flowchart illustrating an operation to be performed when a CPU frequency is calculated.

The following describes an operation to be performed when a CPU frequency is calculated in power saving control, with reference to a flowchart. FIG. 23 is a flowchart illustrating an operation to be performed when a CPU frequency is calculated.

(S51) The job scheduling unit 23 calculates a CPU frequency on the basis of a job extension time.

(S52) After calculating the CPU frequency, the job scheduling unit 23 updates the extendable time in the job information table T2, and also updates the current frequency in the node state table T3.

(S53) The setting information transmission unit 25 notifies the corresponding compute nodes of the calculated CPU frequency.

The following describes a process of changing the CPU frequency calculated in the power saving control, back to the original CPU frequency. The CPU frequency is changed back to the original when a job is completed or when a next job is started.

Figure 24:
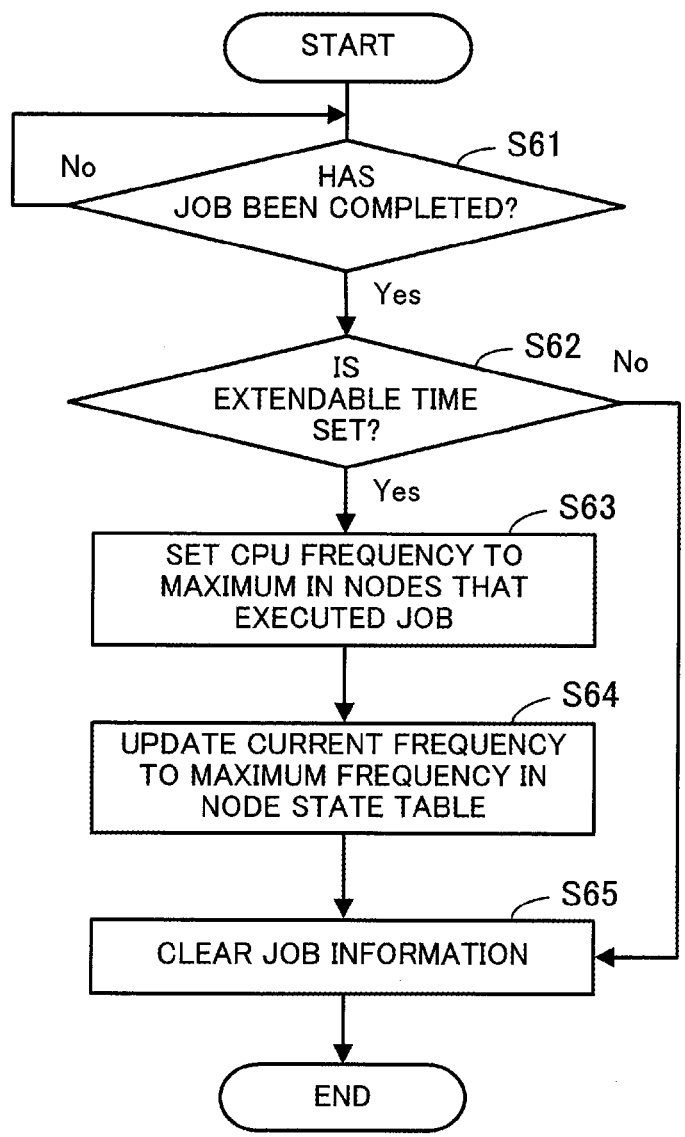
FIG. 24 is a flowchart illustrating an operation for the case where a CPU frequency is changed back to an original when a job is completed.

FIG. 24 is a flowchart illustrating an operation for the case where a CPU frequency is changed back to an original when a job is completed.

(S61) The job scheduling unit 23 determines whether a job has been completed or not. When a job has been completed, the operation goes to step S62. Otherwise, step S61 is repeated.

(S62) The job scheduling unit 23 determines whether an extendable time is set for the completed job or not, that is, whether the completed job is under power saving control or not. When an extendable time is set, the operation proceeds to step S63. Otherwise, the operation proceeds to step S65.

(S63) The job scheduling unit 23 sets the CPU frequency to the maximum in each compute node that executed the completed job.

(S64) The job scheduling unit 23 updates the corresponding current frequency to the maximum frequency in the node state table T3.

(S65) The job scheduling unit 23 clears the job information on the completed job in the job information table T2.

Figure 25:
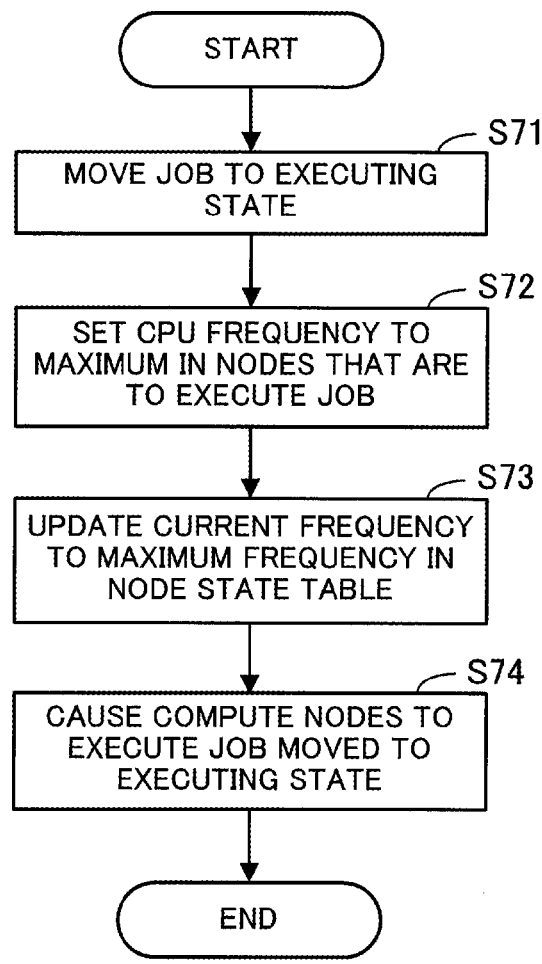
FIG. 25 is a flowchart illustrating an operation for the case where a CPU frequency is changed back to an original when a next job starts.

FIG. 25 is a flowchart illustrating an operation for the case where a CPU frequency is changed back to an original when a next job starts. In the case of changing a CPU frequency back to the original when a next job starts, the CPU frequency is set to the maximum (the CPU frequency is changed back to the original) when the job is moved to an executing state in the normal job scheduling.

(S71) The job scheduling unit 23 moves a job to an executing state.

(S72) The job scheduling unit 23 sets the CPU frequency to the maximum in each compute node that is to execute the job.

(S73) The job scheduling unit 23 updates the corresponding current frequency to the maximum frequency in the node state table T3.

(S74) The job scheduling unit 23 causes the compute nodes to execute the job moved to the executing state.

The following describes a screen display of the user terminal 4. The user terminal 4 visualizes the resource reservation table T1 and others to display the execution states of jobs managed by the management node 2 to a user.

Figure 26:
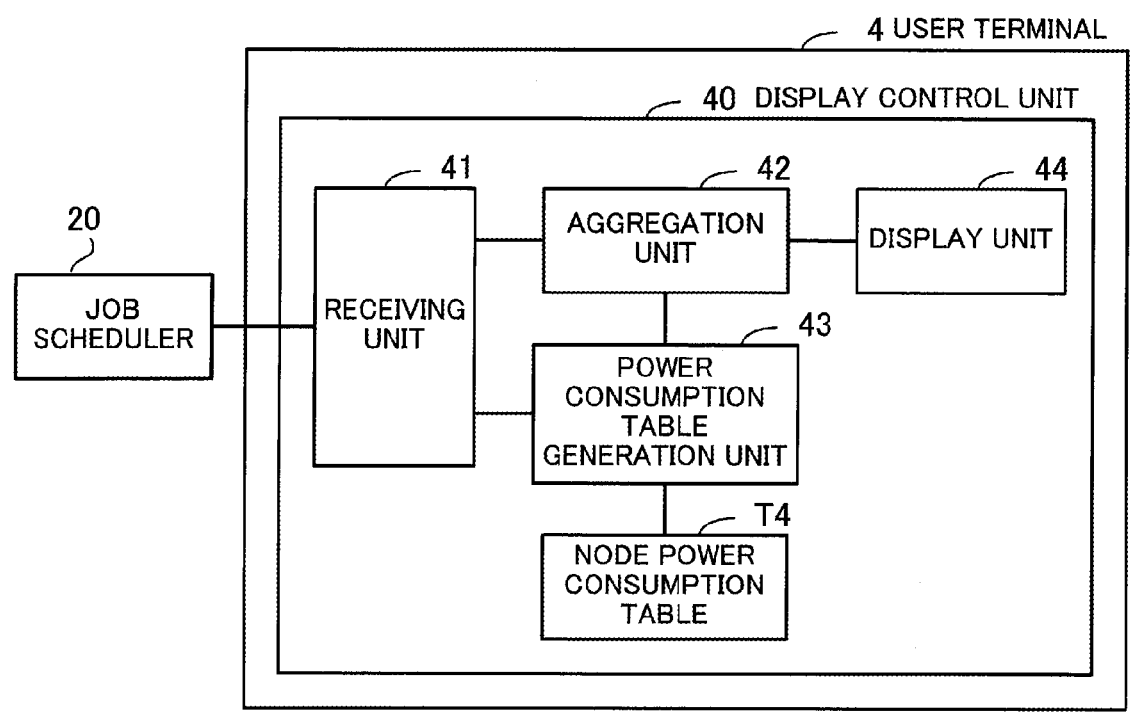
FIG. 26 illustrates an example of a configuration of a display control unit.

FIG. 26 illustrates an example of a configuration of a display control unit. The user terminal 4 includes a display control unit 40, and the job scheduler 20 of the management node 2 transmits information needed for visualization to the display control unit 40. The information to be transmitted may include information registered in various tables, for example, the resource reservation table T1, the job information table T2, and the node state table T3.

The display control unit 40 includes a receiving unit 41, an aggregation unit 42, a node power consumption table T4, a power consumption table generation unit 43, and a display unit 44. The receiving unit 41 receives information sent from the job scheduler 20.

The aggregation unit 42 generates a visualized image by aggregating various information for a screen display. The power consumption table generation unit 43 obtains the amounts of power consumption needed for executing jobs, and generates a power consumption table. The display unit 44 displays the aggregated information on a screen. The information to be displayed includes, for example, the resource reservation table T1 and the power consumption table.

The node power consumption table T4 is a table for managing the power consumption needed for the individual compute nodes 3-1 to 3-n to operate at their available CPU frequencies. In this connection, the power consumption may be measured in advance.

Figure 27:
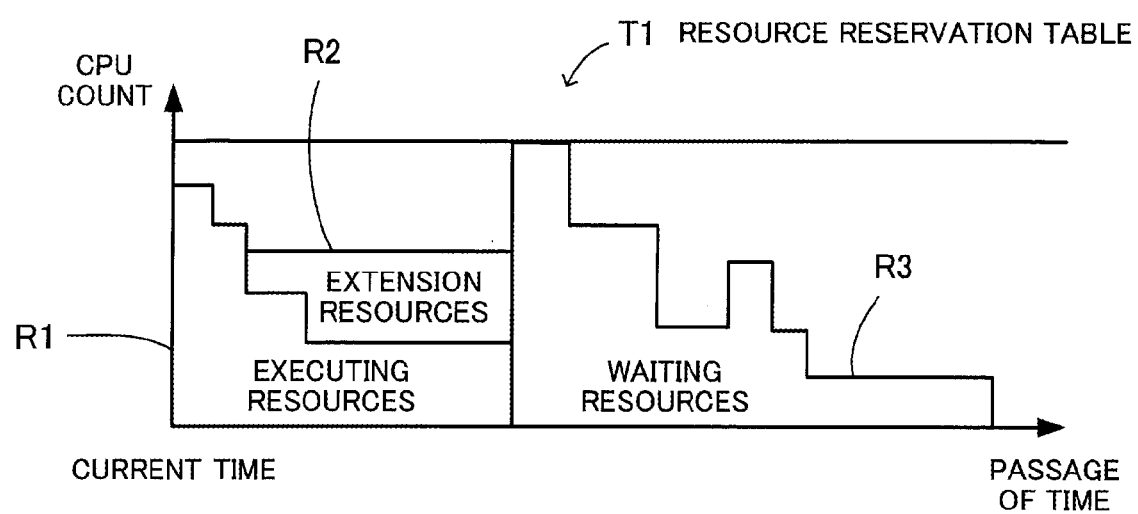
FIG. 27 illustrates a visualized image of a resource reservation table.

The following describes visualization of the resource reservation table T1. FIG. 27 illustrates a visualized image of a resource reservation table. The display control unit 40 displays executing resources R1 (executing jobs), extension resources R2 (extension jobs), and waiting resources R3 (waiting jobs) in the resource reservation table T1.

The executing resources R1 are resources that are not under power saving control and are scheduled for execution through normal job scheduling. The extension resources R2 are resources for extension of execution times and are scheduled for execution with a reduced CPU frequency under power saving control. The waiting resources R3 are resources that are waiting for execution.

In the screen display, these kinds of resources may be displayed by using different colors or another way for easy identification. Such visualization of the resource reservation table T1 provides easy confirmation of assignment of jobs and operating state of power saving control.

Figure 28:
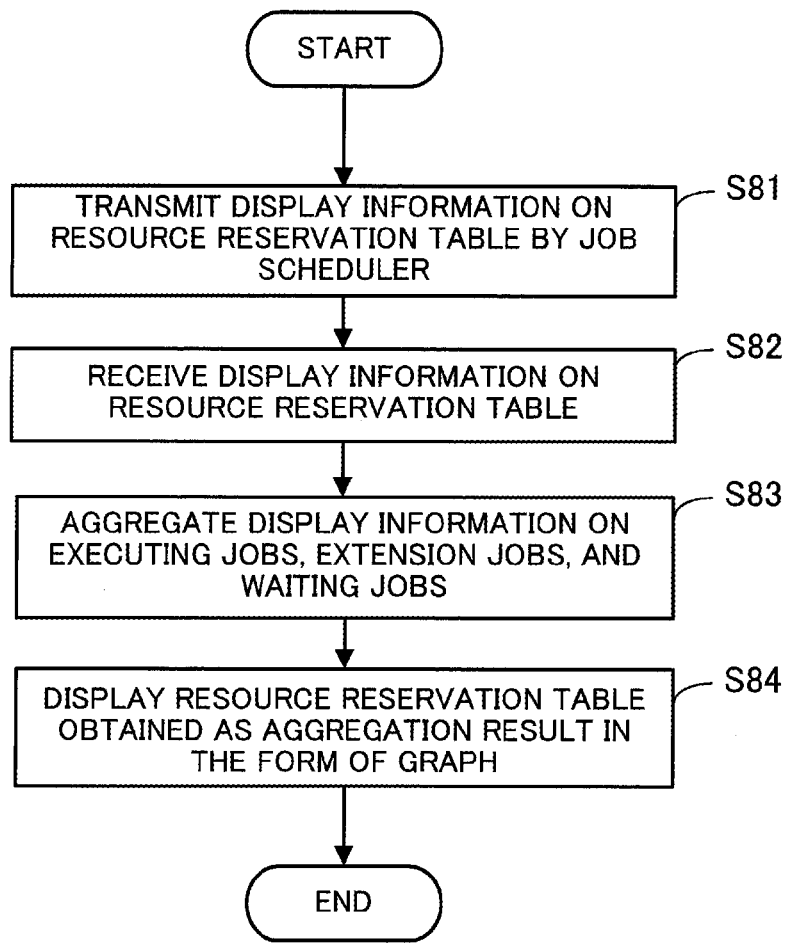
FIG. 28 is a flowchart illustrating an operation for visualizing a resource reservation table.

FIG. 28 is a flowchart illustrating an operation for visualizing a resource reservation table.

(S81) The job operating unit 21 of the job scheduler 20 transmits display information on a resource reservation table T1 to the user terminal 4.

(S82) The receiving unit 41 receives the transmitted display information on the resource reservation table T1.

(S83) The aggregation unit 42 aggregates the display information on executing jobs, extension jobs, and waiting jobs.

(S84) The display unit 44 displays a resource reservation table T1 obtained as an aggregation result in the form of a graph on the screen.

Figure 29:
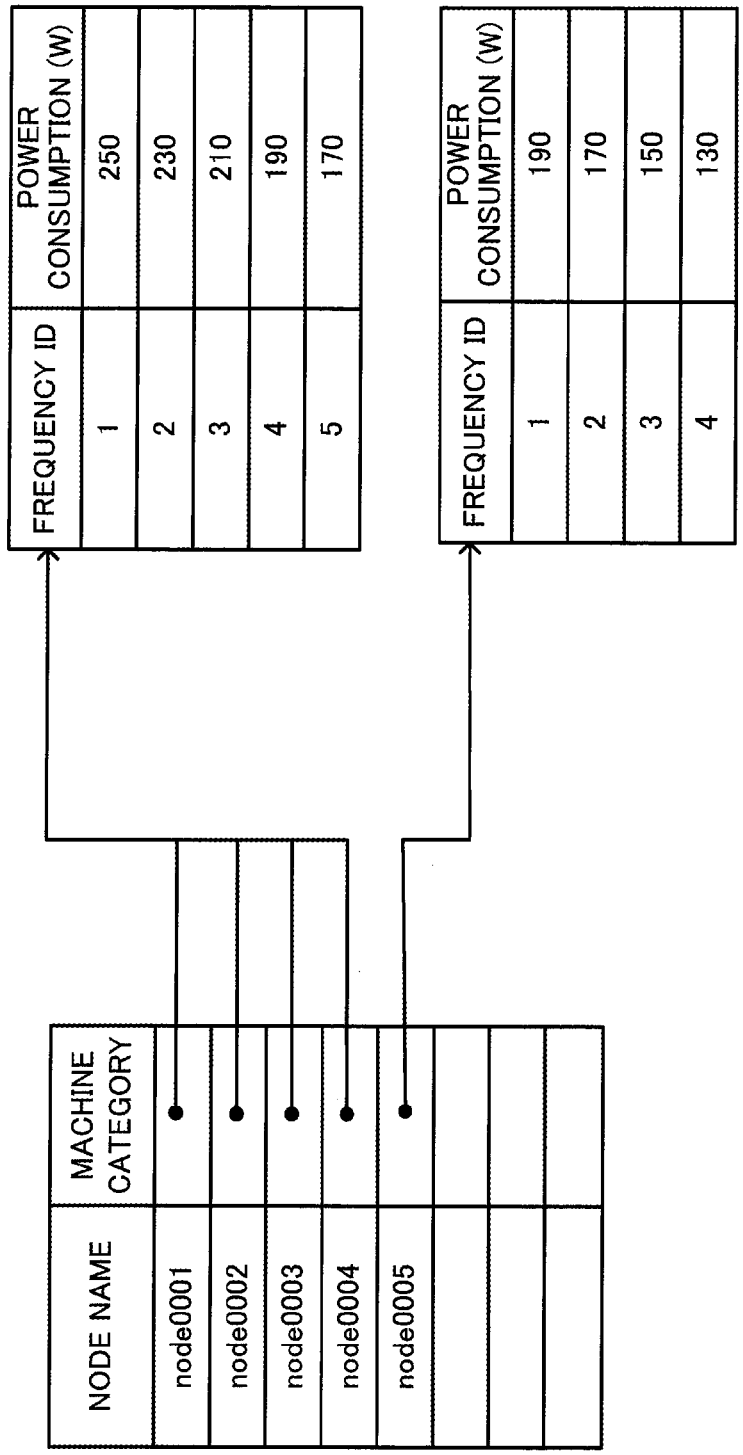
FIG. 29 illustrates an example of a structure of a node power consumption table.

The following describes visualization of power consumption. FIG. 29 illustrates an example of a structure of a node power consumption table. The node power consumption table T4 includes fields: Node Name and Machine Category. The Node Name field contains the identification information of a compute node. The Machine Category field indicates the power consumption amounts for individual frequencies available for the compute node, which includes a frequency ID and power consumption (W).

Referring to FIG. 29, for example, there is a record with a node name of "node0001" and a frequency ID of "1" to "5", and power consumption amounts of "250", "230", "210", "190", and "170" (W) are registered for the frequency IDs of 1 to 5, respectively.

Figure 30:
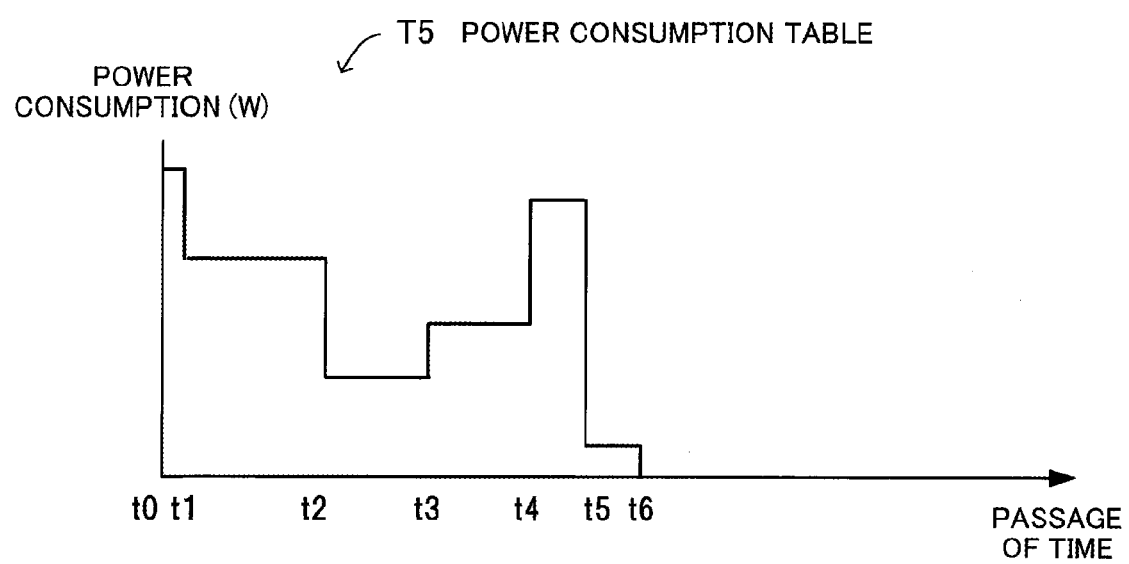
FIG. 30 illustrates a visualized image of a power consumption table.

FIG. 30 illustrates a visualized image of a power consumption table. A power consumption table T5 is a graph that represents power consumption needed for resources (executing resources, extension resources, and waiting resources), in time series, in which the vertical axis represents power consumption (W) and the horizontal axis represents the passage of time. Such visualization of the power consumption table T5 provides easy confirmation of the state of power consumption.

FIG. 31 illustrates a data structure of a power consumption table. The power consumption table T5 manages an increase or decrease in power consumption for each time period. Referring to a data structure T5-1, assuming that an increase in power consumption during a time period from t0 to t1 is 1500, for example, the power consumption during a time period from t1 to t2 is decreased by 320 from that during the time period from t0 to t1, and the power consumption during a time period from t2 to t3 is decreased by 430 from that during the time period from t1 to t2. In this way, an increase or decrease (a difference) in power consumption for each time period is managed.

Figure 32:
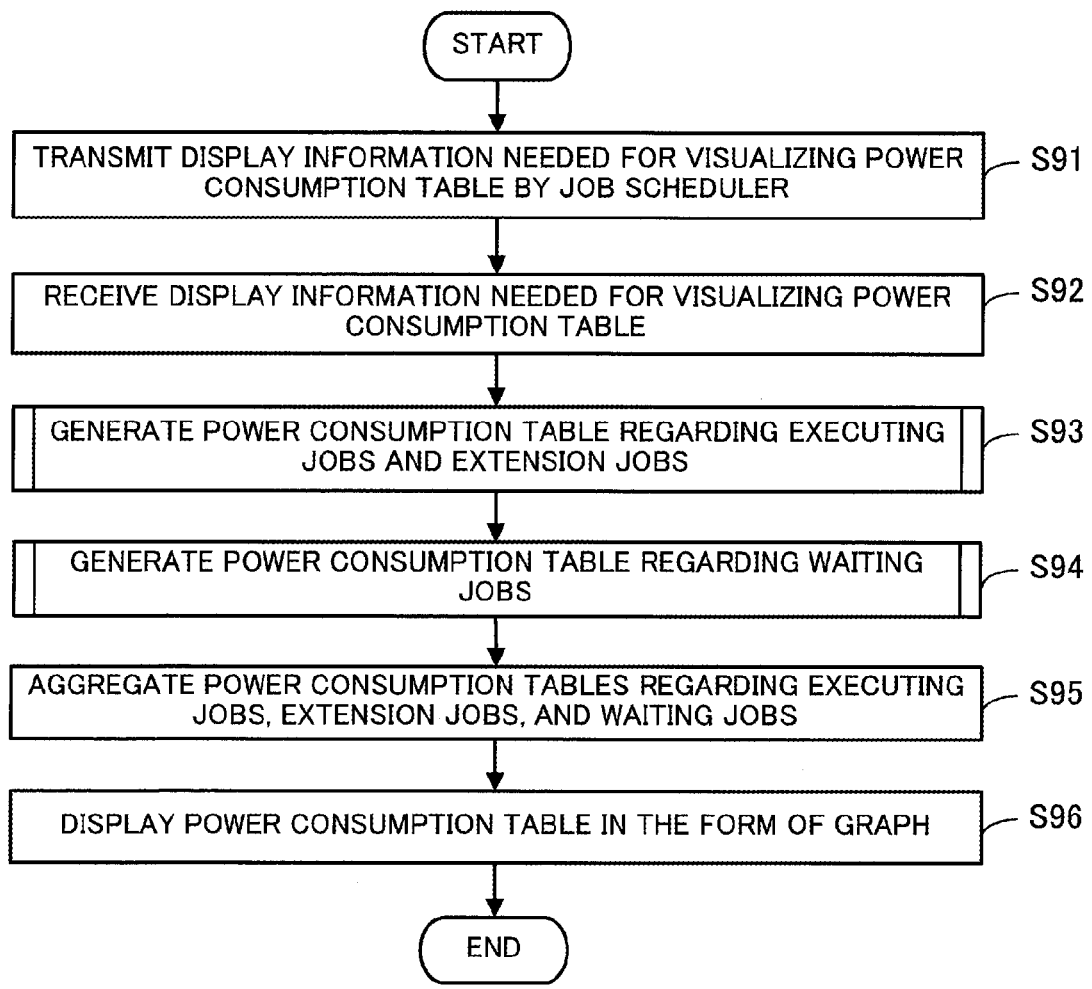
FIG. 32 is a flowchart illustrating an operation for visualizing a power consumption table.

FIG. 32 is a flowchart illustrating an operation for visualizing a power consumption table.

(S91) The job operating unit 21 of the job scheduler 20 transmits display information needed for visualizing the power consumption table T5 to the user terminal 4.

(S92) The receiving unit 41 receives the transmitted display information needed for visualizing the power consumption table T5.

(S93) The power consumption table generation unit 43 generates a power consumption table regarding executing jobs and extension jobs.

(S94) The power consumption table generation unit 43 generates a power consumption table regarding waiting jobs.

(S95) The aggregation unit 42 aggregates the power consumption tables regarding the executing jobs, extension jobs, and waiting jobs.

(S96) The display unit 44 displays the power consumption table T5 obtained as a result of the aggregation in the form of a graph.

Figure 33:
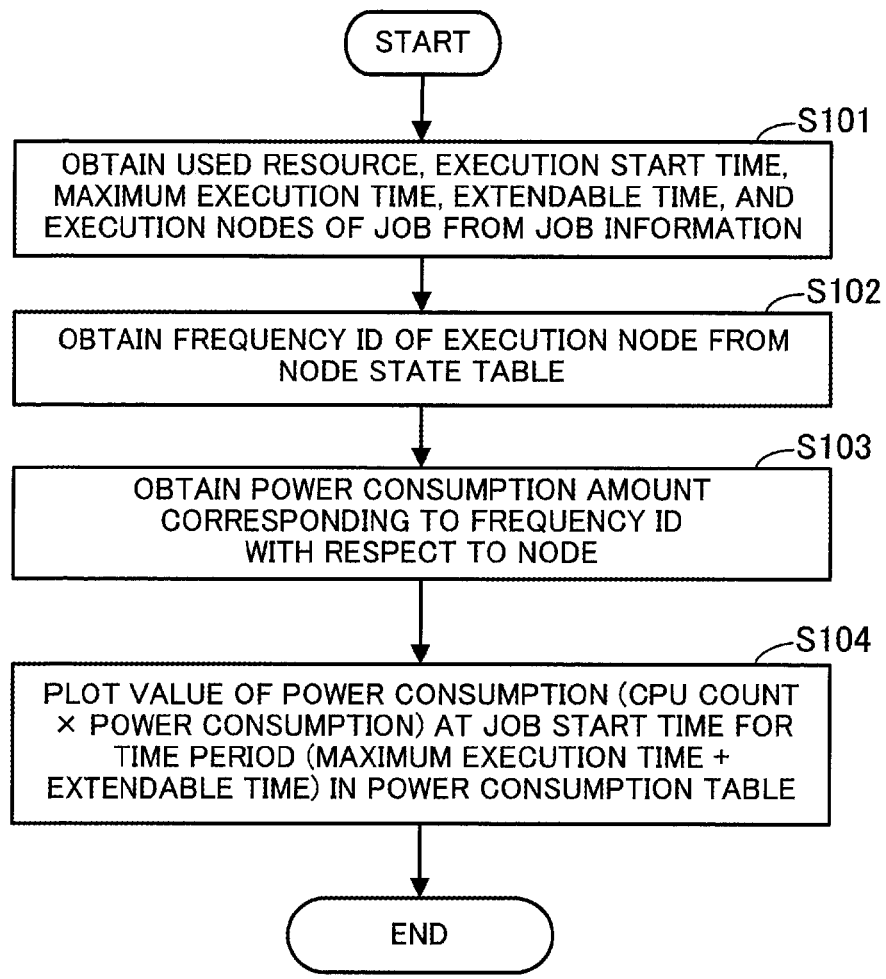
FIG. 33 is a flowchart illustrating an operation for the case where a power consumption table is generated on the basis of executing jobs and extension jobs.

FIG. 33 is a flowchart illustrating an operation for the case where a power consumption table is generated on the basis of executing jobs and extension jobs.

(S101) The power consumption table generation unit 43 obtains, from the job information, a used resource, execution start time, maximum execution time, extendable time, and execution nodes with respect to each executing job.

(S102) The power consumption table generation unit 43 obtains the frequency IDs of the CPU frequencies of the compute nodes that are executing each executing job, from the node state table T3.

(S103) The power consumption table generation unit 43 obtains the power consumption amount used by each of the compute nodes, from the node power consumption table T4, with the obtained frequency ID as a key.

(S104) The power consumption table generation unit 43 plots the value of power consumption (CPU count×power consumption amount) needed to execute the job, at the job start time for a time period of (maximum execution time+extendable time) in the power consumption table T5.

Figure 34:
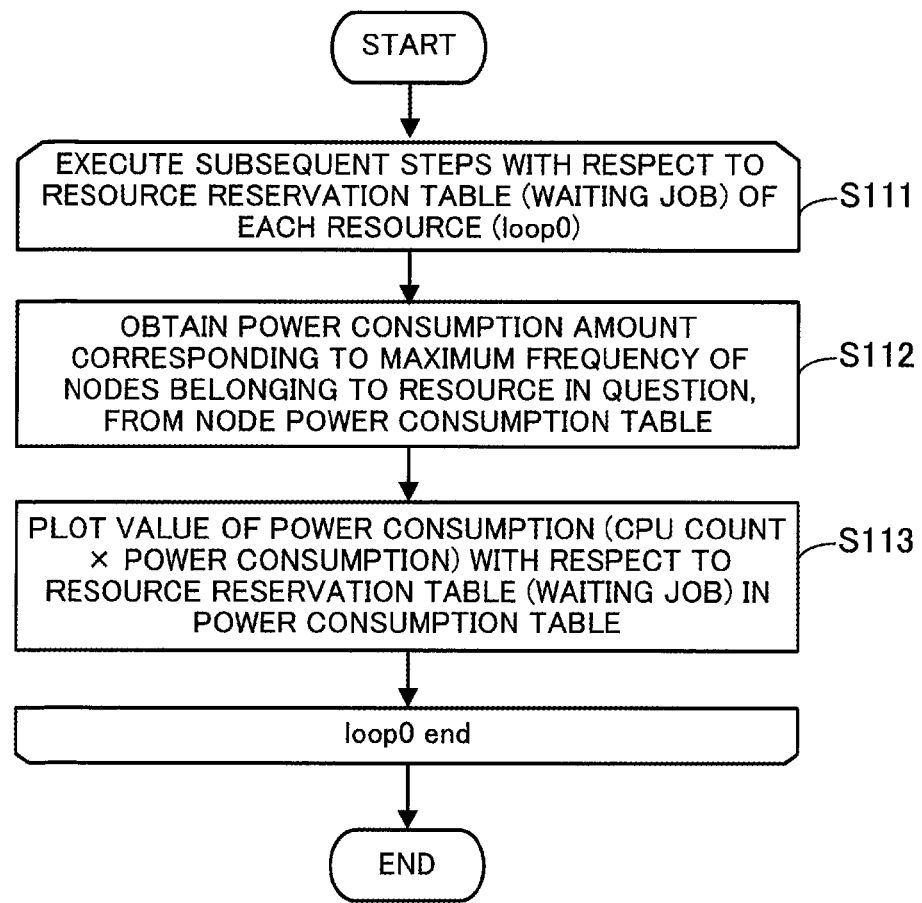
FIG. 34 is a flowchart illustrating an operation for the case where a power consumption table is generated on the basis of waiting jobs.

FIG. 34 is a flowchart illustrating an operation for the case where a power consumption table is generated on the basis of waiting jobs.

(S111) The power consumption table generation unit 43 executes step S112 and subsequent steps with respect to each waiting job of the resource reservation table T1 corresponding to each resource.

(S112) The power consumption table generation unit 43 obtains the power consumption amount corresponding to the maximum frequency of the nodes belonging to the resource in question, from the node power consumption table T4.

(S113) The power consumption table generation unit 43 plots the value of power consumption (CPU count×power consumption amount) with respect to each waiting job of the resource reservation table T1 in the power consumption table T5.

Figure 35:
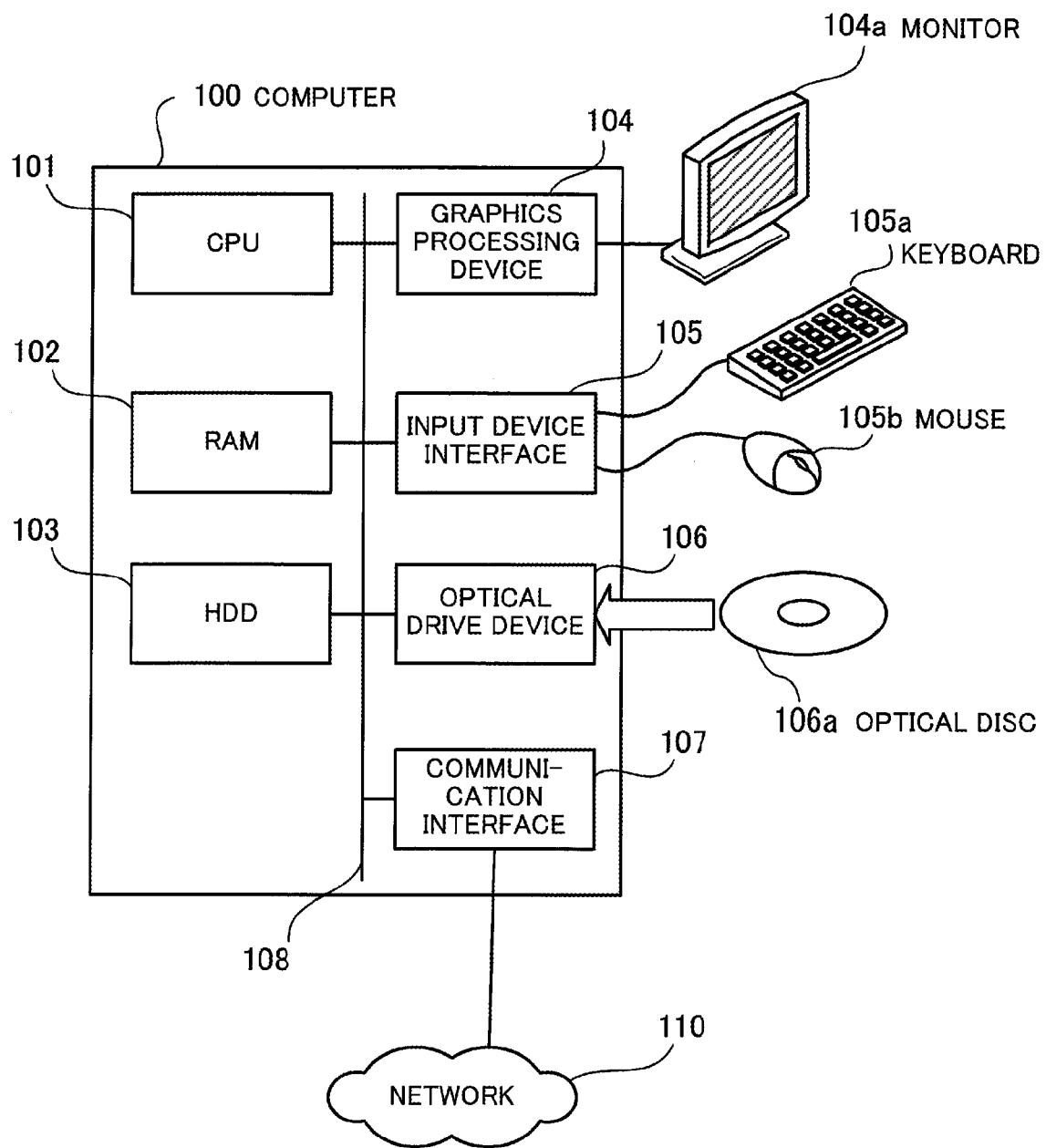
FIG. 35 illustrates an example of a hardware configuration of a computer that is used in the embodiment.

The following describes how to implement the power saving control of the above-described technique by using a computer. The processing functions described above may be implemented by using a computer. FIG. 35 illustrates an example of a hardware configuration of a computer to be used in the embodiment. The computer 100 of the information processing apparatus 10 is entirely controlled by the CPU 101. To the CPU 101, a random access memory (RAM) 102 and a plurality of peripherals are connected via a bus 108.

The RAM 102 is used as a main storage device of the computer 100. The RAM 102 temporarily stores therein at least part of an operating system (OS) program and application programs to be executed by the CPU 101. The RAM 102 also stores therein various kinds of data to be used by the CPU 101 for its processing.

The peripherals connected to the bus 108 include a Hard Disk Drive (HDD) 103, a graphics processing device 104, an input device interface 105, an optical drive device 106, and a communication interface 107.

The HDD 103 magnetically writes and reads data to and from a built-in disk. The HDD 103 is used as a secondary storage device of the computer 100. The HDD 103 stores therein the OS program, application programs, and various kinds of data. Note that, as the secondary device, a semiconductor storage device, such as a flash memory, may be used.

To the graphics processing device 104, a monitor 104a is connected. According to an instruction from the CPU 101, the graphics processing device 104 displays an image on a screen of the monitor 104a. A Cathode Ray Tube (CRT) display, a liquid crystal display, or another display may be used as the monitor 104a.

To the input device interface 105, a keyboard 105a and a mouse 105b are connected. The input device interface 105 gives signals output from the keyboard 105a and the mouse 105b to the CPU 101. In this connection, the mouse 105b is one example of pointing devices, and another pointing device may be used. The other pointing device may be a touch panel, a tablet, a touchpad, a track ball, or another.

The optical drive device 106 reads data from an optical disc 106a with laser beams, etc. The optical disc 106a is a portable recording medium on which data is recorded so as to be read with reflection of light. As the optical disc 106a, a Digital Versatile Disc (DVD), DVD-RAM, Compact Disc Read Only Memory (CD-ROM), CD-R (Readable), CD-RW (ReWritable), etc. may be used.

The communication interface 107 is connected to a network 110. The communication interface 107 performs data communications with other computers or communication apparatuses via the network 110.

The processing functions of this embodiment are implemented with the above hardware configuration. In addition, to implement the above processing functions of the embodiment with a computer, a program is provided, which describes the processing functions of the information processing apparatus 10.

A computer realizes the above processing functions by executing the program. The program describing the intended processes may be recorded on a computer-readable recording medium. Computer-readable recording media include magnetic storage devices, optical discs, magneto-optical recording media, semiconductor memories, etc. The magnetic storage devices include Hard Disk Drives (HDDs), Flexible Disks (FDs), Magnetic Tapes, etc. The optical discs include DVDs, DVD-RAMS, CD-ROMs, CD-RWs, etc. The magneto-optical recording media include Magneto-Optical disks (MOs), etc. In this connection, the recording media for recording programs do not embrace transitory propagating signals per se.

To distribute the program, for example, portable recording media, such as DVDs and CD-ROMs, on which the program is recorded, may be put on sale. Alternatively, the program may be stored in the storage device of a server computer and may be transferred from the server computer to other computers through a network.

A computer which is to execute the program stores in its local storage device the program recorded on a portable recording medium or transferred from the server computer, for example. Then, the computer reads the program from the local storage device, and runs the program. The computer may run the program directly from the portable recording medium. Also, while receiving the program being transferred from the server computer, the computer may sequentially run this program.

In addition, the above-described processing functions may also be implemented wholly or partly by using a Digital Signal Processor (DSP), Application-Specific Integrated Circuit (ASIC), Programmable Logic Device (PLD), or other electronic circuits.

As described above, when an idle time of a CPU is caused by job scheduling, this technique reduces the operating frequency of the CPU for executing a job scheduled to be executed immediately before the idle time, below the maximum frequency. This makes it possible to reduce the time during which an HPC computing resource system operates with the maximum power consumption.

It should be noted that simply reducing a CPU frequency may result in decreasing the overall job throughput of the HPC computing resource system. By contrast, according to this technique, a job scheduler detects resources that are expected not to be used for a while, uses their idle time to extend the execution of a job by reducing the CPU frequency. This makes it possible to reduce the time during which the HPC computing resource system operates with the maximum power consumption while reducing the possibility of decreasing the overall job throughput of the HPC computing resource system.

The foregoing is merely illustrative of the embodiment. Any components described in the embodiment may be replaced with other components having equivalent functions. Further, any desired components or steps may be added.

According to one aspect, it is possible to reduce the time during which the maximum power is consumed for operation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a processor configured to perform a procedure including
detecting an idle time caused by job scheduling, and
reducing an operating frequency for executing a job scheduled to be executed immediately before the idle time, below a maximum frequency, wherein:
the processor creates a tentative extension resource for an increase in use of a used resource so as to extend execution of the job to an end of the idle time, performs a tentative assignment of the tentative extension resource to a scheduled end time of the job in a resource reservation table, the resource reservation table managing a variation in an amount of resources for executing jobs in time series, and when the tentative assignment of the tentative extension resource does not exceed a maximum resource amount of the resource reservation table, determines that the job corresponding to the tentative extension resource is an extendable job.

2. The information processing apparatus according to claim 1, wherein the processor reduces the operating frequency such that an execution time of the job is extended to an execution start time of a waiting job, which is included in the idle time.

3. The information processing apparatus according to claim 1,
wherein the processor searches the resource reservation table in ascending order of time to detect the idle time based on a time at which the amount of resources increases.

4. The information processing apparatus according to claim 1, wherein the processor calculates the operating frequency using a dependence of hardware elements that execute the job.

5. The information processing apparatus according to claim 3, wherein
the information processing apparatus is connected to a terminal device having a display control function,
wherein the terminal device performs one or both of display control for displaying the resource reservation table that distinguishably displays executing jobs, extension jobs for extension of execution times, and waiting jobs and display control for displaying a power consumption table that indicates power consumption needed for the jobs in time series.

6. A power saving control method to be executed by an information processing apparatus for performing power saving control, the power saving control method comprising:
detecting an idle time of a processor caused by job scheduling;
reducing an operating frequency of the processor for executing a job scheduled to be executed immediately before the idle time, below a maximum frequency;
creating a tentative extension resource for an increase in use of a used resource so as to extend execution of the job to an end of the idle time;
tentatively assigning the tentative extension resource to a scheduled end time of the job in a resource reservation table, the resource reservation table managing a variation in an amount of resources for executing jobs in time series; and
determining that the job corresponding to the tentative extension resource is an extendable job, when the tentatively assigning of the tentative extension resource does not exceed a maximum resource amount of the resource reservation table.

7. A computer-readable storage medium storing a computer program causing an information processing apparatus to perform a procedure comprising:
detecting, upon activation of power saving control, an idle time of a processor caused by job scheduling;
reducing an operating frequency of the processor for executing a job scheduled to be executed immediately before the idle time, below a maximum frequency;
creating a tentative extension resource for an increase in use of a used resource so as to extend execution of the job to an end of the idle time;
tentatively assigning the tentative extension resource to a scheduled end time of the job in a resource reservation table, the resource reservation table managing a variation in an amount of resources for executing jobs in time series; and
determining that the job corresponding to the tentative extension resource is an extendable job, when the tentatively assigning of the tentative extension resource does not exceed a maximum resource amount of the resource reservation table.

* * * * *